United States Patent
Mori et al.

(10) Patent No.: US 9,923,504 B2
(45) Date of Patent: Mar. 20, 2018

(54) CONTROL DEVICE FOR AC ROTARY MACHINE AND CONTROL DEVICE FOR ELECTRIC POWER STEERING

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/524,531

(22) PCT Filed: Jan. 21, 2015

(86) PCT No.: PCT/JP2015/051502
§ 371 (c)(1),
(2) Date: May 4, 2017

(87) PCT Pub. No.: WO2016/117047
PCT Pub. Date: Jul. 28, 2016

(65) Prior Publication Data
US 2017/0331405 A1    Nov. 16, 2017

(51) Int. Cl.
*H02P 6/14* (2016.01)
*H02P 25/22* (2006.01)

(52) U.S. Cl.
CPC .................................... *H02P 25/22* (2013.01)

(58) Field of Classification Search
CPC ...................................................... H02P 25/22

(Continued)

(56) References Cited

U.S. PATENT DOCUMENTS

2009/0115362 A1* 5/2009 Saha .................... B60K 6/26
                                                318/400.09
2011/0080125 A1* 4/2011 Shimada ............... H02P 5/74
                                                318/400.09

(Continued)

FOREIGN PATENT DOCUMENTS

JP    03-230767 A    10/1991
JP    2003-189670 A    7/2003

(Continued)

OTHER PUBLICATIONS

International Search Report of PCT/JP2015/051502 dated Apr. 21, 2015.

*Primary Examiner* — Jorge L Carrasquillo
(74) *Attorney, Agent, or Firm* — Sughrue Mion, PLLC; Richard C. Turner

(57) ABSTRACT

In a control device for an AC rotary machine that includes a first three-phase winding and a second three-phase winding having a phase difference, a voltage is applied to each phase of the first three-phase winding at an ON interval or an OFF interval equaling or exceeding a first predetermined value. When a first three-phase current is determined to be undetectable, a first voltage command is generated such that ON timings or OFF timings relating respectively to at least two phases of the voltage applied to the first three-phase winding are within a second predetermined value that is smaller than the first predetermined value, and when a second three-phase current is determined to be undetectable, a second voltage command is generated such that ON timings or OFF timings relating respectively to at least two phases of a voltage applied to the second three-phase winding are within the second predetermined value.

19 Claims, 31 Drawing Sheets

(58) Field of Classification Search
USPC ....... 318/801, 400.17, 400.26, 400.41, 568.2
See application file for complete search history.

(56) References Cited

U.S. PATENT DOCUMENTS

| | | | |
|---|---|---|---|
| 2011/0080131 A1* | 4/2011 | Shimada | H02P 27/04 318/503 |
| 2014/0239861 A1 | 8/2014 | Ajima et al. | |
| 2016/0190972 A1* | 6/2016 | Mori | H02M 7/53873 318/490 |

FOREIGN PATENT DOCUMENTS

| | | | |
|---|---|---|---|
| JP | 2008-113494 A | | 5/2008 |
| JP | 2008-219956 A | | 9/2008 |
| JP | 2008219956 A | * | 9/2008 |
| JP | 2012-178927 A | | 9/2012 |
| JP | 2014-168332 A | | 9/2014 |

* cited by examiner

FIG. 3

| Sup1 | Sun1 | Svp1 | Svn1 | Swp1 | Swn1 | FIRST VOLTAGE VECTOR | Idc1 |
|---|---|---|---|---|---|---|---|
| 0 | 1 | 0 | 1 | 0 | 1 | V0(1) | 0 |
| 1 | 0 | 0 | 1 | 0 | 1 | V1(1) | Iu1 |
| 1 | 0 | 1 | 0 | 0 | 1 | V2(1) | −Iw1 |
| 0 | 1 | 1 | 0 | 0 | 1 | V3(1) | Iv1 |
| 0 | 1 | 1 | 0 | 1 | 0 | V4(1) | −Iu1 |
| 0 | 1 | 0 | 1 | 1 | 0 | V5(1) | Iw1 |
| 1 | 0 | 0 | 1 | 1 | 0 | V6(1) | −Iv1 |
| 1 | 0 | 1 | 0 | 1 | 0 | V7(1) | 0 |

FIG. 4

| Sup2 | Sun2 | Svp2 | Svn2 | Swp2 | Swn2 | SECOND VOLTAGE VECTOR | Idc2 |
|---|---|---|---|---|---|---|---|
| 0 | 1 | 0 | 1 | 0 | 1 | V0(2) | 0 |
| 1 | 0 | 0 | 1 | 0 | 1 | V1(2) | Iu2 |
| 1 | 0 | 1 | 0 | 0 | 1 | V2(2) | −Iw2 |
| 0 | 1 | 1 | 0 | 0 | 1 | V3(2) | Iv2 |
| 0 | 1 | 1 | 0 | 1 | 0 | V4(2) | −Iu2 |
| 0 | 1 | 0 | 1 | 1 | 0 | V5(2) | Iw2 |
| 1 | 0 | 0 | 1 | 1 | 0 | V6(2) | −Iv2 |
| 1 | 0 | 1 | 0 | 1 | 0 | V7(2) | 0 |

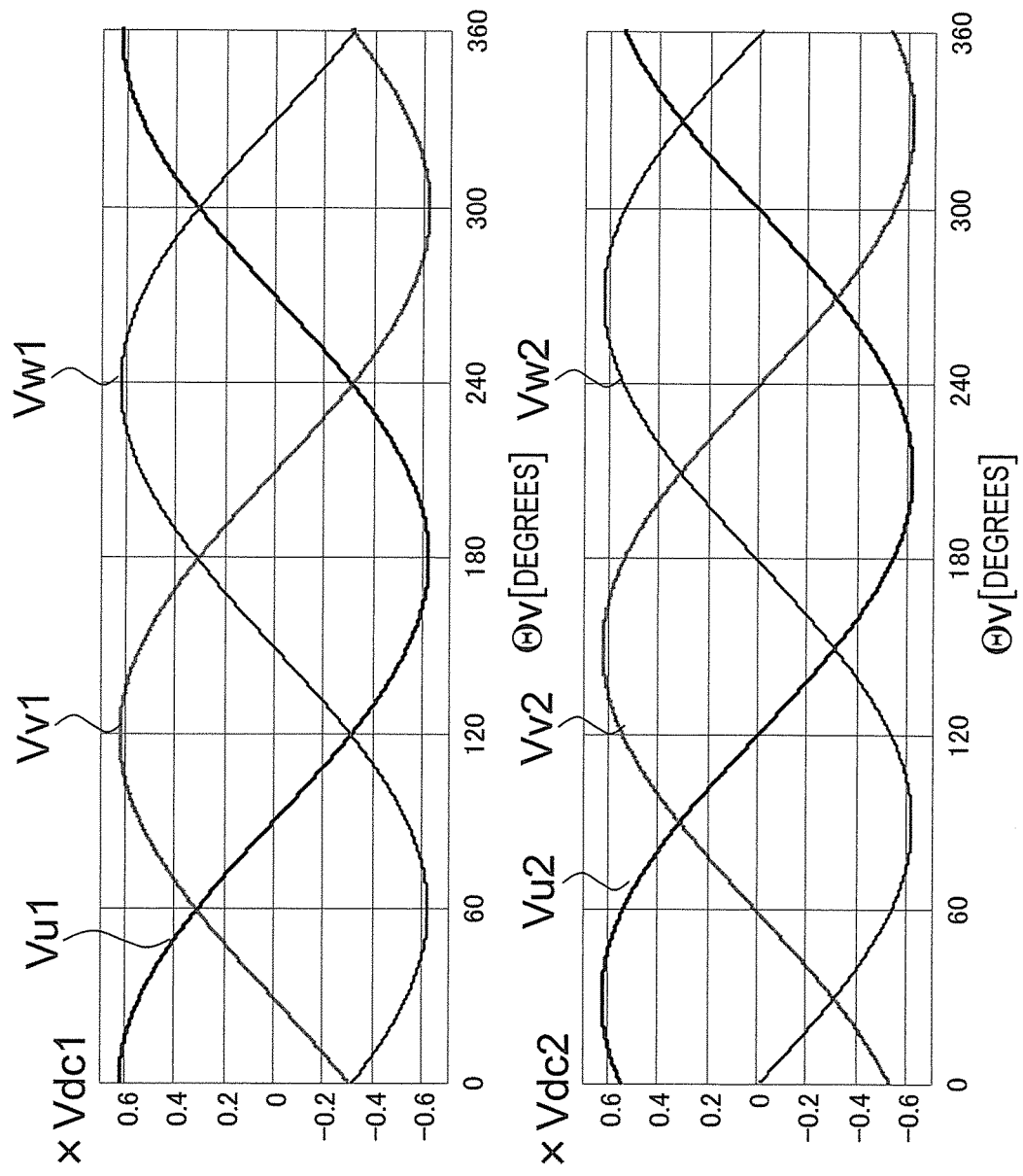

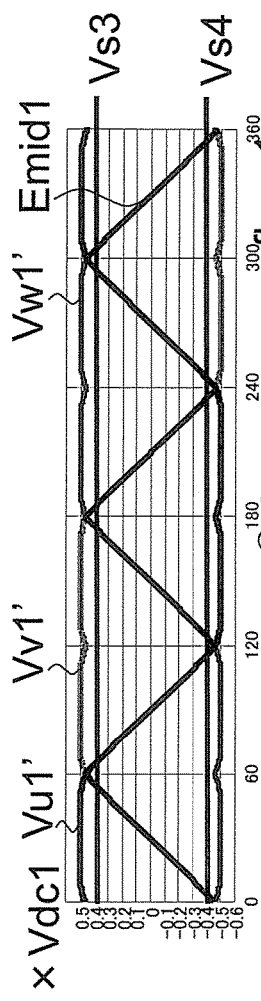
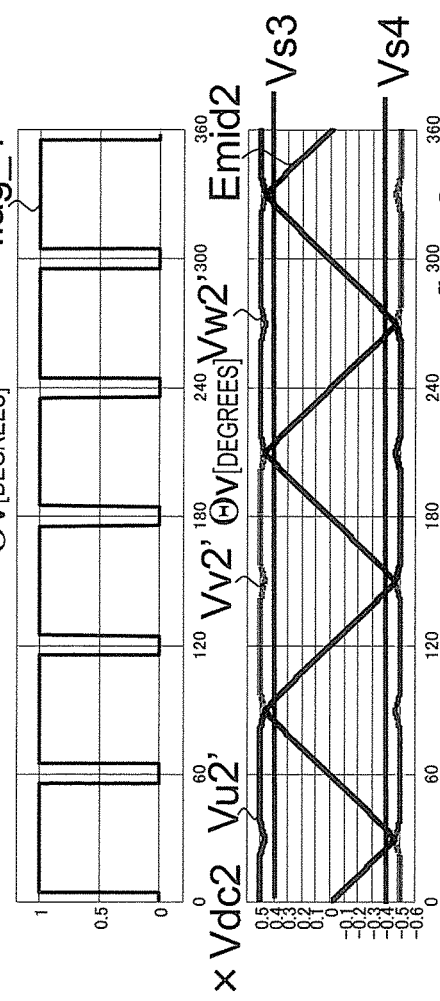
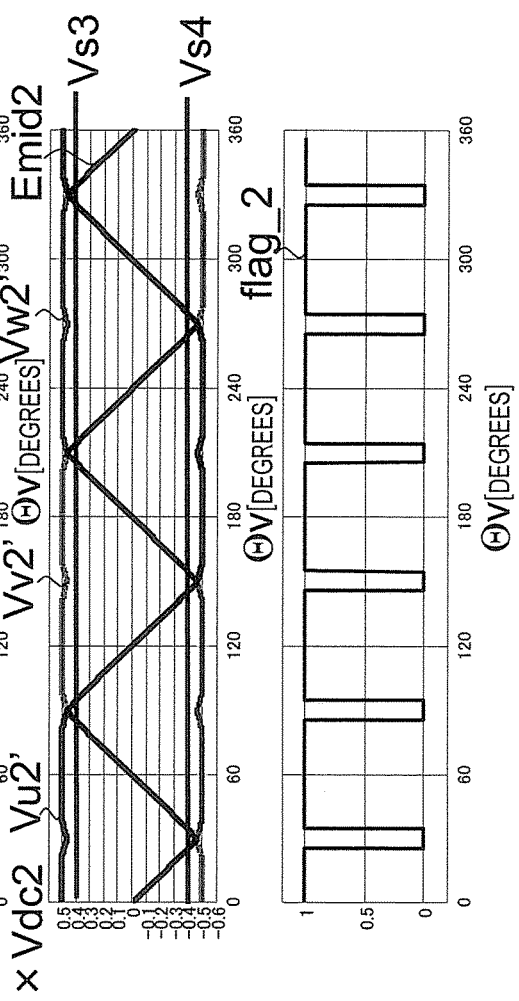
FIG. 23A
FIG. 23B
FIG. 23C
FIG. 23D

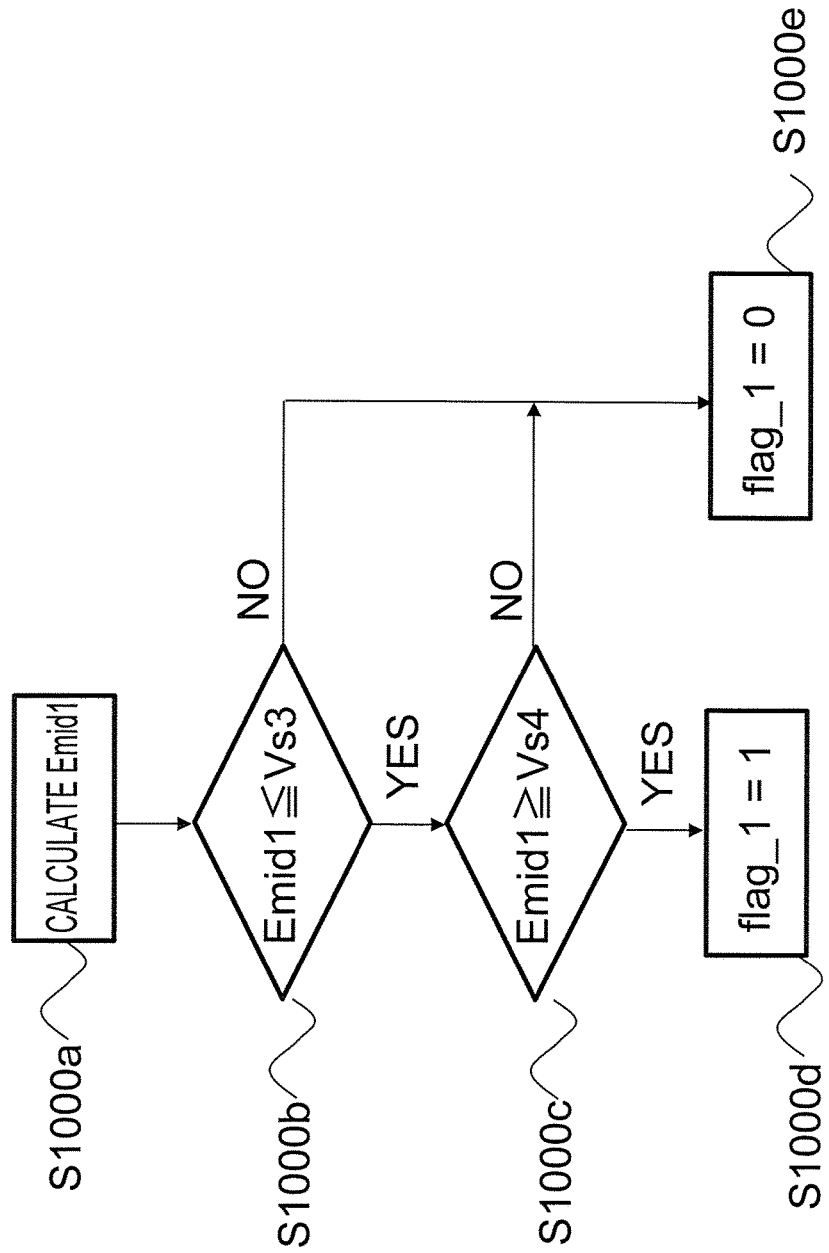

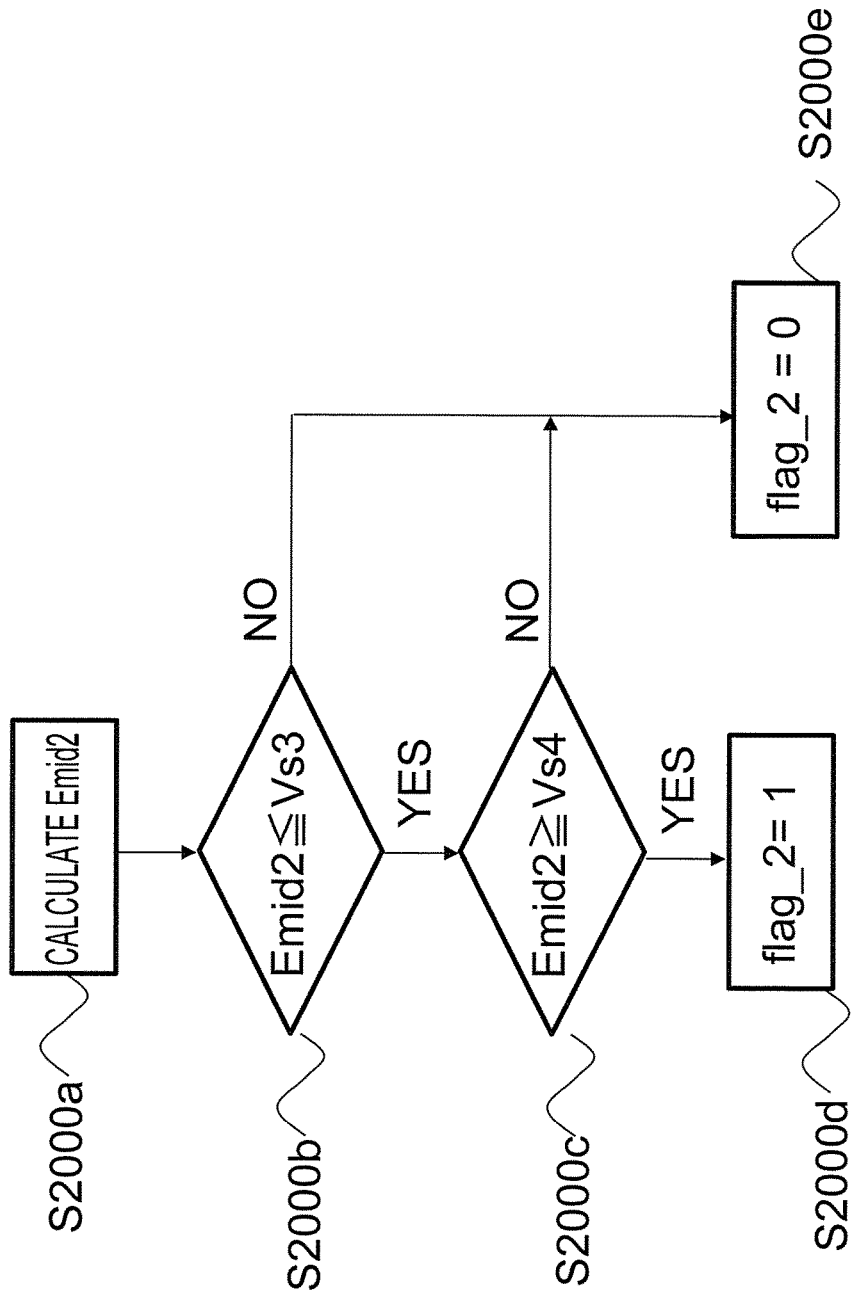

CONTROL DEVICE FOR AC ROTARY MACHINE AND CONTROL DEVICE FOR ELECTRIC POWER STEERING

CROSS REFERENCE TO RELATED APPLICATIONS

This application is a National Stage of International Application No. PCT/JP2015/051502 filed Jan. 21, 2015, the contents of which are incorporated herein by reference in its entirety.

TECHNICAL FIELD

This invention relates to a control device for an AC rotary machine and a control device for an electric power steering, with which the output of the AC rotary machine can be improved without the need to modify a control period.

BACKGROUND ART

In a conventional phase current detection device for a three-phase PWM inverter device, a control period Tsw is varied in length in accordance with a phase command value $\theta^*$ and a voltage command value $V^*$. In a disclosed example (see PTL 1, for example), when a holding time (t1 or t2) of a switching mode corresponding to any basic voltage vector other than a zero vector, the basic voltage vector being determined in accordance with the phase command value $\theta^*$ and the voltage command value $V^*$, is longer than a sum (tdd+tsw) of a dead time tdd of an inverter main circuit and a time tsw required for current detection by a Hall CT 9, a fixed short control period Tsw is selected. When the holding time of the switching mode is shorter than the time (tdd+tsw), on the other hand, the control period Tsw is lengthened so that the holding time is longer than the time (tdd+tsw).

CITATION LIST

Patent Literature

[PTL 1] Japanese Patent Application Publication H3-230767

SUMMARY OF INVENTION

Technical Problem

However, the prior art includes the following problem. When the control period Tsw is lengthened, a PWM period (which is equal to the control period Tsw) output by the three-phase PWM inverter apparatus increases in length, leading to a reduction in a PWM frequency, which is given by the inverse of the PWM period.

When an AC rotary machine is connected to the output of the three-phase PWM inverter, a component of the PWM frequency is included in a current flowing through the AC rotary machine. Therefore, when the PWM frequency decreases, the frequency of the component included in the current also decreases, with the result that noise is generated from the AC rotary machine.

Noise reduction is particularly important in an AC rotary machine used in an electric power steering, and therefore the PWM frequency is set at or above 20 kHz (a frequency band exceeding the audible range), for example. Here, when a method in which the control period Tsw is lengthened (the PWM frequency is reduced), such as that disclosed in PTL 1, is applied to an AC rotary machine used in an electric power steering, the PWM frequency falls below 20 kHz. As a result, noise is generated by the AC rotary machine, causing discomfort to people traveling in a vehicle installed with the electric power steering.

This invention has been designed to solve the problem described above, and an object thereof is to provide a control device for an AC rotary machine and a control device for an electric power steering with which the output of the AC rotary machine can be improved without the need to modify a control period.

Solution to Problem

A control device for an AC rotary machine according to this invention includes: an AC rotary machine that includes a first three-phase winding and a second three-phase winding having a phase difference; a DC power supply for outputting a DC voltage; a control unit that calculates a first voltage command and a second voltage command on the basis of a current command and a detected current value of the AC rotary machine; a first voltage application device that applies a voltage to each phase of the first three-phase winding at an ON interval or an OFF interval equaling or exceeding a first predetermined value by ON/OFF-controlling the DC voltage supplied by the DC power supply on the basis of the first voltage command; a second voltage application device that applies a voltage to each phase of the second three-phase winding at an ON interval or an OFF interval equaling or exceeding the first predetermined value by ON/OFF-controlling the DC voltage supplied by the DC power supply on the basis of the second voltage command; a first current detector that detects a first three-phase current on the basis of a first bus current flowing between the DC power supply and the first voltage application device; a second current detector that detects a second three-phase current on the basis of a second bus current flowing between the DC power supply and the second voltage application device; a first detectability determination device that determines whether or not the first three-phase current is detectable on the basis of at least one of the first voltage command and the second voltage command; and a second detectability determination device that determines whether or not the second three-phase current is detectable on the basis of at least one of the first voltage command and the second voltage command, wherein, when the first detectability determination device determines that the first three-phase current is undetectable, the control unit generates the first voltage command such that ON timings or OFF timings relating respectively to at least two phases of the voltage applied to the first three-phase winding are within a second predetermined value that is smaller than the first predetermined value, and when the second detectability determination device determines that the second three-phase current is undetectable, the control unit generates the second voltage command such that ON timings or OFF timings relating respectively to at least two phases of the voltage applied to the second three-phase winding are within the second predetermined value.

Further, a control device for an electric power steering according to this invention includes the control device for an AC rotary machine according to this invention, wherein the control unit calculates the first voltage command and the second voltage command such that the AC rotary machine generates torque for assisting steering torque of a steering system.

Advantageous Effects of Invention

According to this invention, a voltage is applied to each phase of the first three-phase winding at an ON interval or an OFF interval equaling or exceeding the first predetermined value. When the first three-phase current is determined to be undetectable, the first voltage command is generated such that the ON timings or OFF timings relating respectively to at least two phases of the voltage applied to the first three-phase winding are within the second predetermined value that is smaller than the first predetermined value, and when the second three-phase current is determined to be undetectable, the second voltage command is generated such that the ON timings or OFF timings relating respectively to at least two phases of the voltage applied to the second three-phase winding are within the second predetermined value. Hence, the effects of switching noise generated when the voltage applied to the first three-phase winding is switched ON or OFF can be prevented from appearing at the detection timing of the second bus current, and likewise, the effects of switching noise generated when the voltage applied to the second three-phase winding is switched ON or OFF can be prevented from appearing at the detection timing of the first bus current. As a result, a striking effect not present in the prior art is achieved in that the output of the AC rotary machine can be improved while reducing noise therein without the need to modify the control period.

BRIEF DESCRIPTION OF DRAWINGS

FIG. 3 is a view showing relationships between Idc1 and first voltage vectors V0(1) to V7(1) corresponding respectively to ON/OFF conditions of semiconductor switches Sup1 to Swn1, according to the first embodiment of this invention.

FIG. 4 is a view showing relationships between a current that is equal to Idc2 and second voltage vectors V0(2) to V7(2) corresponding respectively to ON/OFF conditions of semiconductor switches Sup2 to Swn2, according to the first embodiment of this invention.

FIGS. 6A and 6B are waveform diagrams showing first voltage commands Vu1, Vv1, Vw1 and second voltage commands Vu2, Vv2, Vw2 according to the first embodiment of this invention.

FIGS. 23A-23D are illustrative views relating to functions of a first detectability determination device and a second detectability determination device according to the first embodiment of this invention.

FIG. 24 is a flowchart showing a series of operations executed by the first detectability determination device according to the first embodiment of this invention.

FIG. 25 is a flowchart showing a series of operations executed by the second detectability determination device according to the first embodiment of this invention.

DESCRIPTION OF EMBODIMENTS

Preferred embodiments of a control device for an AC rotary machine and a control device for an electric power steering according to this invention will be described below using the drawings.

First Embodiment

Figure 1:
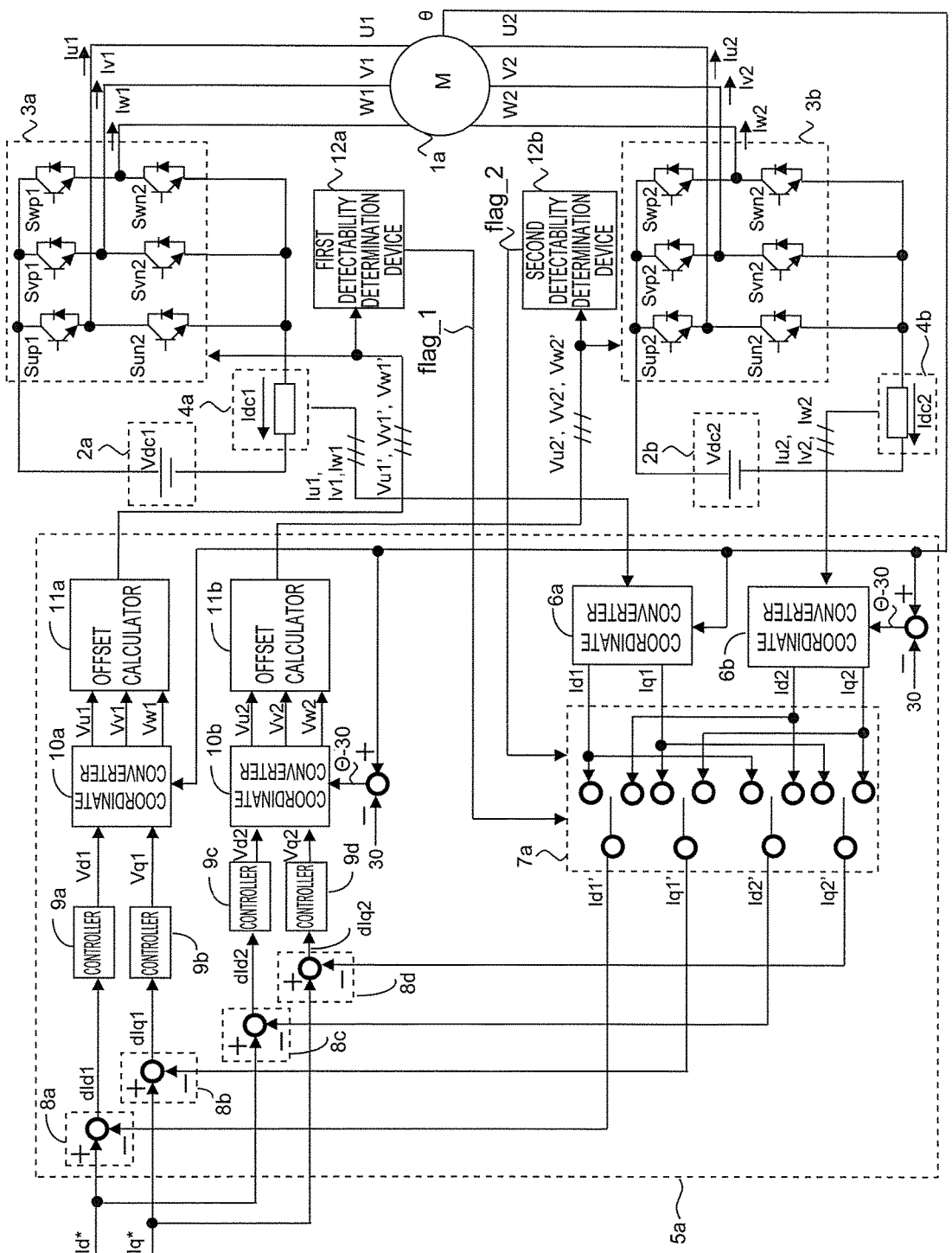
FIG. 1 is a view showing an overall configuration of a control device for an AC rotary machine according to a first embodiment of this invention.
Figure 2:
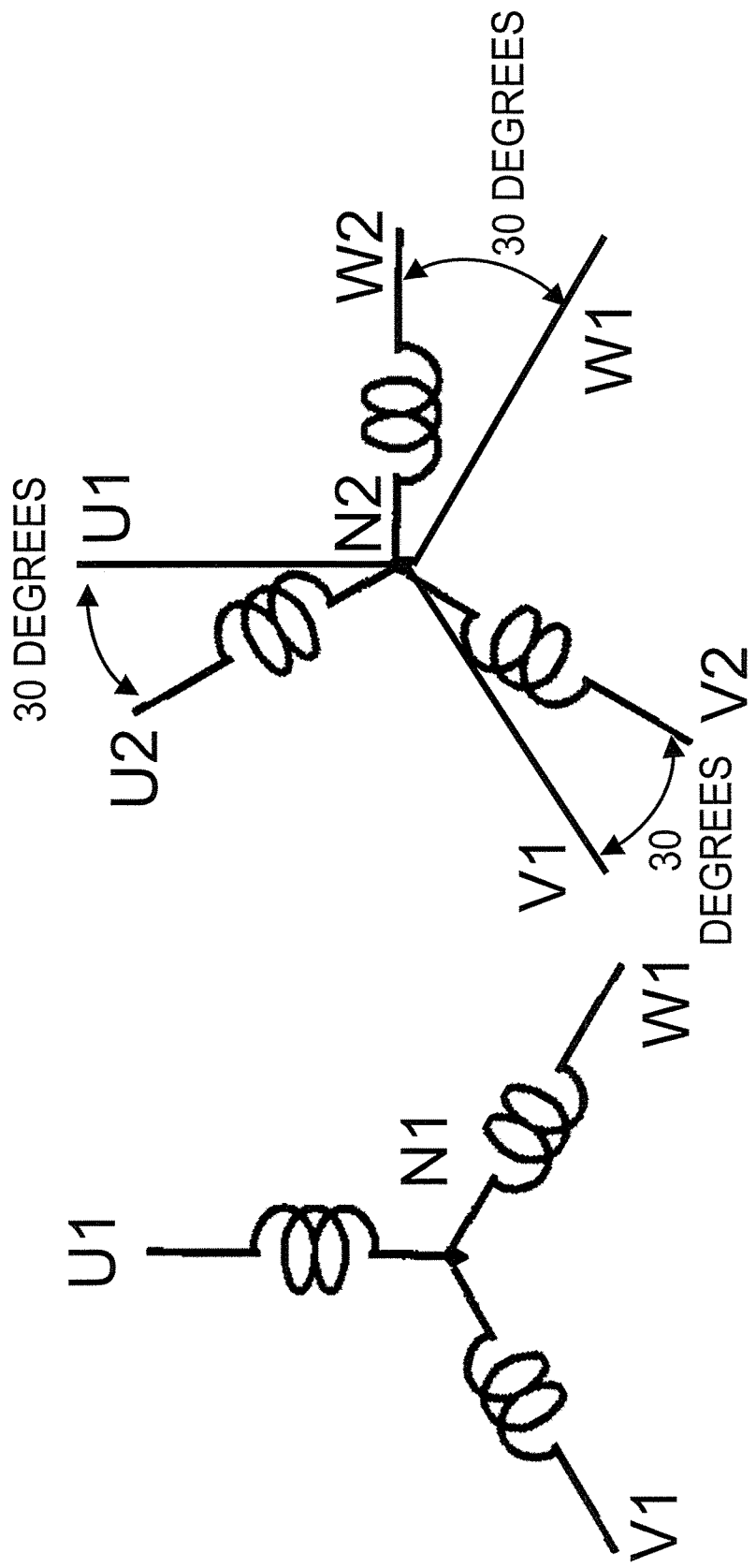
FIG. 2 is a view illustrating a configuration of a three-phase AC power generator used as the AC rotary machine according to the first embodiment of this invention.

FIG. 1 is a view showing an overall configuration of a control device for an AC rotary machine according to a first embodiment of this invention, and FIG. 2 is a view illustrating a configuration of a three-phase AC power generator used as the AC rotary machine according to the first embodiment of this invention. An AC rotary machine 1a shown in FIG. 1 is a three-phase AC rotary machine in which, as shown in FIG. 2, first three-phase windings U1, V1, W1 connected by a neutral point N1 and second three-phase windings U2, V2, W2 connected by a neutral point N2 are housed in a stator of a rotary machine without being electrically connected.

Note that 30 degree phase differences are provided respectively between the U1 winding and the U2 winding, between the V1 winding and the V2 winding, and between the W1 winding and the W2 winding. In FIG. 2, a case in which the first three-phase windings and the second three-phase windings are both connected in a Y connection is shown as an example of the AC rotary machine 1a, but this invention may also be applied to a Δ connection.

A DC power supply 2a outputs a DC voltage Vdc1 to a first voltage application device 3a, and a DC power supply 2b outputs a DC voltage Vdc2 to a second voltage application device 3b. The DC power supplies 2a, 2b include all devices that output a DC voltage, such as a battery, a DC-DC converter, a diode rectifier, and a PWM rectifier. A configuration in which DC voltages are output to the first voltage application device 3a and the second voltage application device 3b using one of the DC power supplies 2a, 2b is also included in the scope of this invention.

The first voltage application device 3a switches semiconductor switches Sup1, Sun1, Svp1, Svn1, Swp1, Swn1 (in the following description, these six semiconductor switches will be referred to as the semiconductor switches Sup1 to Swn1) ON and OFF by implementing PWM modulation on first voltage commands Vu1', Vv1', Vw1' using an inverse conversion circuit (an inverter). In so doing, the first voltage application device 3a power-converts the DC voltage Vdc1 input from the DC power supply 2a into an AC voltage, and applies the AC voltage to the first three-phase windings U1, V1, W1 of the AC rotary machine 1a.

Here, each of the semiconductor switches Sup1 to Swn1 is constituted by a semiconductor switch such as an IGBT, a bipolar transistor, or a MOS power transistor, and a diode connected in anti-parallel to the semiconductor switch.

The second voltage application device 3b switches semiconductor switches Sup2, Sun2, Svp2, Svn2, Swp2, Swn2 (in the following description, these six semiconductor switches will be referred to as the semiconductor switches Sup2 to Swn2) ON and OFF by implementing PWM modulation on second voltage commands Vu2', Vv2', Vw2' using an inverse conversion circuit (an inverter). In so doing, the second voltage application device 3b power-converts the DC voltage Vdc2 input from the DC power supply 2b into an AC voltage, and applies the AC voltage to the second three-phase windings U2, V2, W2 of the AC rotary machine 1a.

Here, each of the semiconductor switches Sup2 to Swn2 is constituted by a semiconductor switch such as an IGBT, a bipolar transistor, or a MOS power transistor, and a diode connected in anti-parallel to the semiconductor switch.

A first current detector 4a uses a current sensor such as a shunt resistor or a current transformer (a CT) to detect a current Idc1 flowing through a first DC bus of a first power converter 3a. FIG. 3 is a view showing relationships between Idc1 and first voltage vectors V0(1) to V7(1) corresponding respectively to the ON/OFF conditions of the semiconductor switches Sup1 to Swn1, according to the first embodiment of this invention. As regards the respective conditions of Sup1 to Swn1 in FIG. 3, "1" indicates that a switch is switched ON, and "0" indicates that a switch is switched OFF.

The first current detector 4a detects first three-phase currents Iu1, Iv1, Iw1 on the basis of the relationships shown in FIG. 3. Note that the first current detector 4a may detect two phases of the first three-phase currents Iu1, Iv1, Iw1 from Idc1, and the remaining phase may be determined by calculation using the fact that the sum of the currents of the three phases is zero.

A second current detector 4b uses a current sensor such as a shunt resistor or a current transformer (a CT) to detect a current Idc2 flowing through a second DC bus of a second power converter 3b. FIG. 4 is a view showing relationships between a current that is equal to Idc2 and second voltage vectors V0(2) to V7(2) corresponding respectively to the ON/OFF conditions of the semiconductor switches Sup2 to Swn2, according to the first embodiment of this invention. As regards the respective conditions of Sup2 to Swn2 in FIG. 4, "1" indicates that a switch is switched ON, and "0" indicates that a switch is switched OFF.

The second current detector 4b detects second three-phase currents Iu2, Iv2, Iw2 on the basis of the relationships shown in FIG. 4. Note that the second current detector 4b may detect two phases of the second three-phase currents Iu2, Iv2, Iw2 from Idc2, and the remaining phase may be determined by calculation using the fact that the sum of the currents of the three phases is zero.

Further, the numeral (1) in parentheses in the first voltage vectors shown in FIG. 3 and the numeral (2) in parentheses in the second voltage vectors shown in FIG. 4 are used to differentiate the first voltage vectors from the second voltage vectors. Hence, (1) is appended to the first voltage vectors based on the first voltage commands, and (2) is appended to the second voltage vectors based on the second voltage commands.

A first detectability determination device 12a determines whether or not the first three-phase currents are detectable on the basis of the first voltage commands Vu1', Vv1', Vw1', and outputs a first detectability determination signal flag_1.

Further, a second detectability determination device 12b determines whether or not the second three-phase currents are detectable on the basis of the second voltage commands Vu2', Vv2', Vw2', and outputs a second detectability determination signal flag_2.

Next, a control unit 5a will be described. A coordinate converter 6a calculates currents Id1, Iq1 of the first windings on two rotational axes by converting the first three-phase currents Iu1, Iv1, Iw1 detected by the first current detector 4a into currents on rotating coordinates on the basis of a rotation position θ of the AC rotary machine 1a.

A coordinate converter 6b calculates currents Id2, Iq2 of the second windings on two rotational axes by converting the second three-phase currents Iu2, Iv2, Iw2 detected by the second current detector 4b into currents on rotating coordinates on the basis of a position θ-30 obtained by subtracting 30 degrees from the rotation position θ of the AC rotary machine 1a.

When the first three-phase currents are determined to be detectable on the basis of the first detectability determination signal flag_1, a switch 7a switches the currents Id1, Iq1 of the first windings so that the currents are output respectively as currents Id1', Iq1' on rotating two-axis coordinates. In addition, when the first three-phase currents are determined to be undetectable on the basis of the first detectability determination signal flag_1, the switch 7a switches the currents Id2, Iq2 of the second windings so that the currents are output respectively as the currents Id1', Iq1' on rotating two-axis coordinates.

Furthermore, when the second three-phase currents are determined to be detectable on the basis of the second detectability determination signal flag_2, the switch 7a switches the currents Id2, Iq2 of the second windings so that the currents are output respectively as currents Id2', Iq2' on rotating two-axis coordinates. In addition, when the second three-phase currents are determined to be undetectable on the basis of the second detectability determination signal flag_2, the switch 7a switches the currents Id1, Iq1 of the first windings so that the currents are output respectively as the currents Id2', Iq2' on rotating two-axis coordinates.

Here, the currents Id1', Iq1' on rotating two-axis coordinates and the currents Id2', Iq2' on rotating two-axis coordinates respectively correspond to current detection values used to calculate voltage commands Vd1, Vq1 on rotating two-axis coordinates and voltage commands Vd2, Vq2 on rotating two-axis coordinates, as will be described below.

Note that here, the three-phase currents of the windings on the detectable side are used as is as the three-phase currents on the undetectable side, but the three-phase currents on the undetectable side may be determined using a different estimation method.

A subtractor 8a calculates a deviation dId1 between a d axis current command Id* of the AC rotary machine 1a and the current Id1' on rotating two-axis coordinates, output by the switch 7a. In addition, a subtractor 8b calculates a deviation dIq1 between a q axis current command Iq* of the AC rotary machine 1a and the current Iq1' on rotating two-axis coordinates, output by the switch 7a.

Further, a subtractor 8c calculates a deviation dId2 between the d axis current command Id* of the AC rotary machine 1a and the current Id2' on rotating two-axis coordinates, output by the switch 7a. In addition, a subtractor 8d calculates a deviation dIq2 between the q axis current command Iq* of the AC rotary machine 1a and the current Iq2' on rotating two-axis coordinates, output by the switch 7a.

A controller 9a calculates the voltage command Vd1 on rotating two-axis coordinates using a P controller and a PI controller so that the deviation dId1 is controlled to zero. In addition, a controller 9b calculates the voltage command Vq1 on rotating two-axis coordinates using a P controller and a PI controller so that the deviation dIq1 is controlled to zero.

Further, a controller 9c calculates the voltage command Vd2 on rotating two-axis coordinates using a P controller and a PI controller so that the deviation dId2 is controlled to zero. In addition, a controller 9d calculates the voltage command Vq2 on rotating two-axis coordinates using a P controller and a PI controller so that the deviation dIq2 is controlled to zero.

A coordinate converter 10a calculates first voltage commands Vu1, Vv1, Vw1 by performing coordinate conversion to convert the voltage commands Vd1, Vq1 on rotating two-axis coordinates into three-phase AC coordinates on the basis of the rotation position θ of the AC rotary machine 1a.

Further, a coordinate converter 10b calculates second voltage commands Vu2, Vv2, Vw2 by performing coordinate conversion to convert the voltage commands Vd2, Vq2 on rotating two-axis coordinates into three-phase AC coordinates on the basis of the position θ-30 obtained by subtracting 30 degrees from the rotation position θ of the AC rotary machine 1a.

An offset calculator 11a adds an offset voltage Voffset1 to the first voltage commands Vu1, Vv1, Vw1, as shown below in Equations (1) to (3), and outputs the results as the first voltage commands Vu1', Vv1', Vw1'.

$$Vu1' = Vu1 + Voffset1 \quad (1)$$

$$Vv1' = Vv1 + Voffset1 \quad (2)$$

$$Vw1' = Vw1 + Voffset1 \quad (3)$$

An offset calculator 11b adds an offset voltage Voffset2 to the second voltage commands Vu2, Vv2, Vw2, as shown below in Equations (4) to (6), and outputs the results as the second voltage commands Vu2', Vv2', Vw2'.

$$Vu2' = Vu2 + Voffset2 \quad (4)$$

$$Vv2' = Vv2 + Voffset2 \quad (5)$$

$$Vw2' = Vw2 + Voffset2 \quad (6)$$

Figure 5:
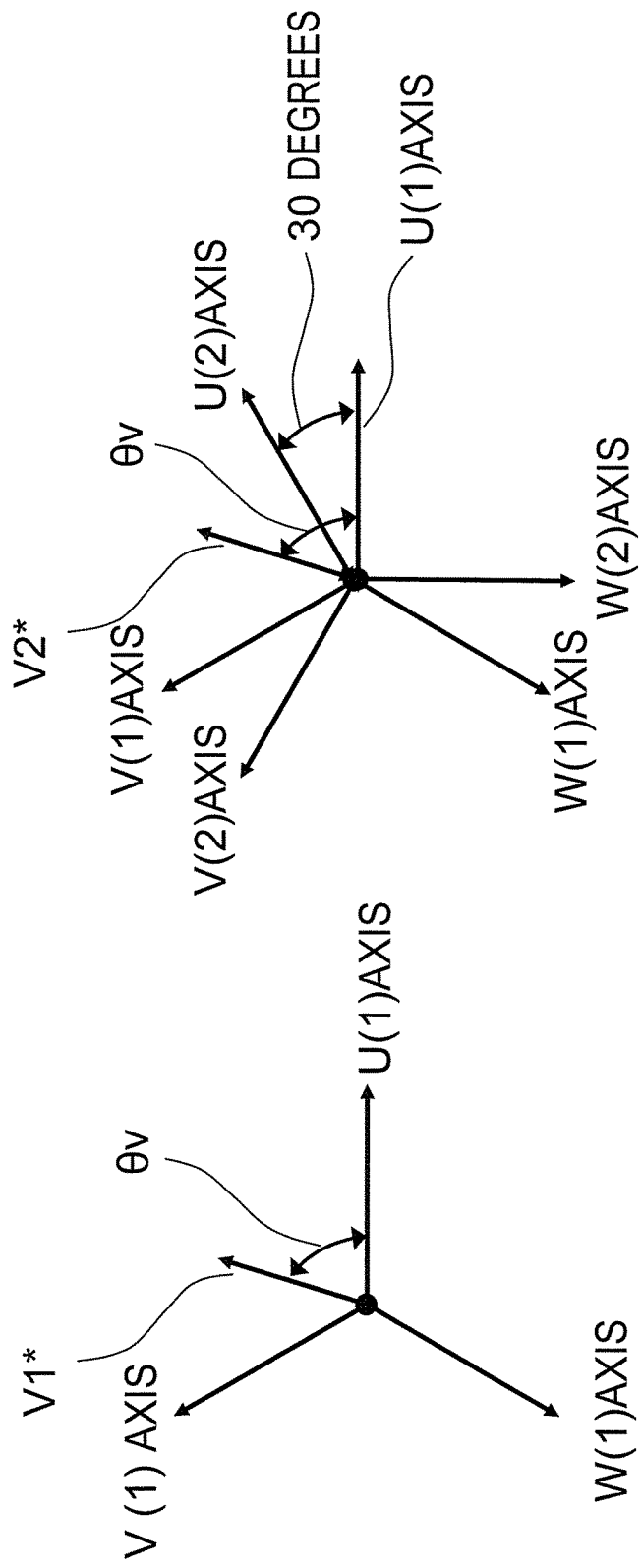
FIG. 5 is an illustrative view showing a first voltage command vector V1* based on first voltage commands Vu1', Vv1', Vw1' and a second voltage command vector V2* based on second voltage commands Vu2', Vv2', Vw2', according to the first embodiment of this invention.

Next, the first voltage commands, the second voltage commands, and operations of the first detectability determination device 12a will be described in detail. FIG. 5 is an illustrative view showing a first voltage command vector V1* based on the first voltage commands Vu1', Vv1', Vw1' and a second voltage command vector V2* based on the second voltage commands Vu2', Vv2', Vw2', according to the first embodiment of this invention. As shown in FIG. 5, the first voltage command vector V1* and the second voltage command vector V2* are vectors that rotate about a U(1)-V(1)-W(1) axis and a U(2)-V(2)-W(2) axis, respectively.

Note that numerals shown in parentheses in FIG. 5 denote either axes corresponding to the first windings or axes corresponding to the second windings. More specifically, U(1), V(1), W(1), to which (1) is appended, respectively denote axes corresponding to the U phase, the V phase, and the W phase of the first windings, while U(2), V(2), W(2), to which (2) is appended, respectively denote axes corresponding to the U phase, the V phase, and the W phase of the second windings. Here, phase angles of the first voltage command vector V1* and the second voltage command vector V2* when the U(1) axis is used as a reference are both $\theta v$. In other words, no phase difference exists therebetween.

FIGS. 6A and 6B are waveform diagrams showing the first voltage commands Vu1, Vv1, Vw1 and the second voltage commands Vu2, Vv2, Vw2 according to the first embodiment of this invention. The U(2), V(2), and W(2) axes shown in FIG. 5 are respectively retarded by a phase of 30 degrees relative to the U(1), V(1), and W(1) axes. Therefore, as shown in FIGS. 6A and 6B, the second voltage commands Vu2, Vv2, Vw2 are respectively retarded by a phase of 30 degrees relative to the first voltage commands Vu1, Vv1, Vw1.

In FIGS. 6A and 6B, the abscissa shows the voltage phase angle $\theta v$ when the U(1) axis is used as a reference. Hence, with respect to the AC rotary machine 1a, in which a 30 degree phase difference exists between the first windings and the second windings, a 30 degree phase difference exists between the first voltage commands and the second voltage commands. Similarly, with respect to an AC rotary machine in which a phase difference of 30+60×N (where N is an integer) degrees exists between the first windings and the second windings, a 30+60×N degree phase difference exists between the first voltage commands and the second voltage commands.

Figures 7A, 7B, 7C:
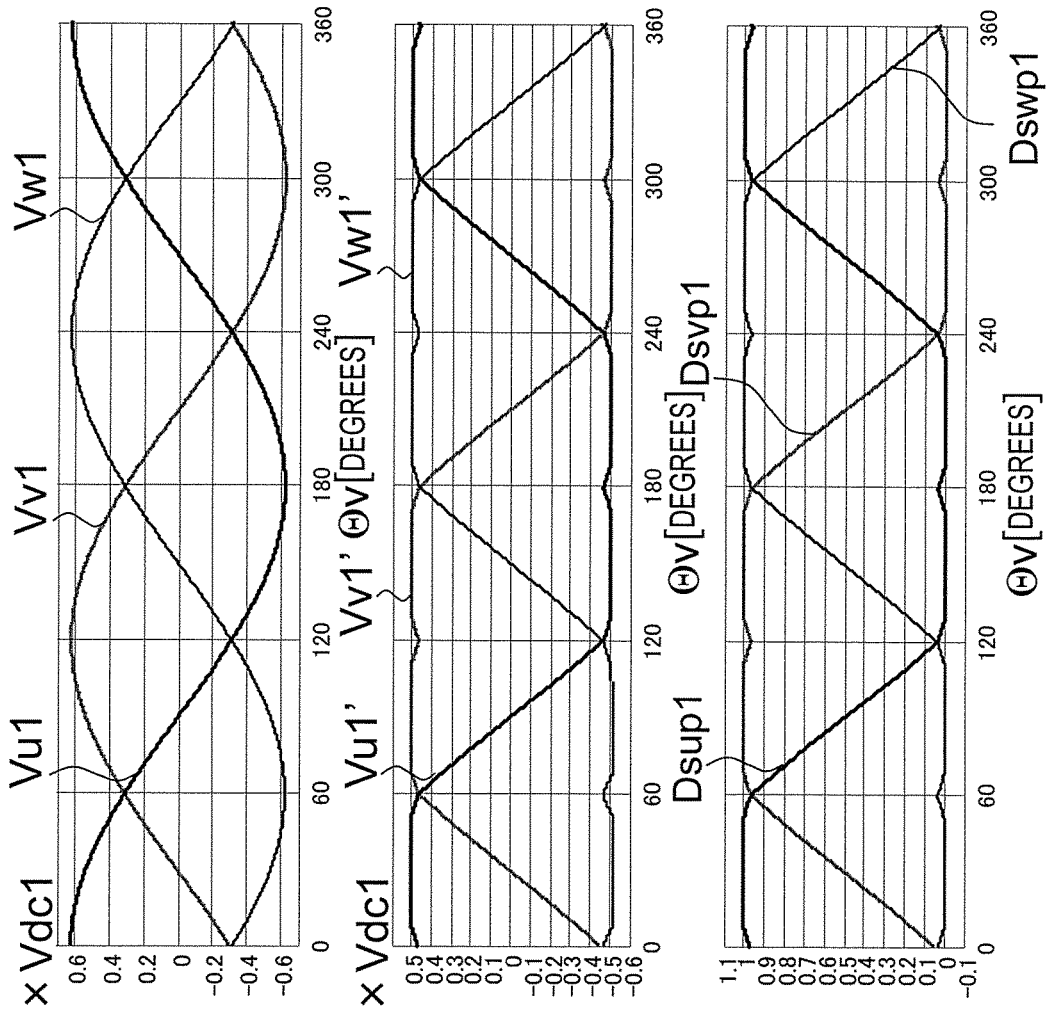
FIGS. 7A-7C are views illustrating relationships between the voltage commands and ON ratios of upper side arm elements of respective phases with respect to a first voltage application device, according to the first embodiment of this invention.

FIGS. 7A-7C are views illustrating relationships between the voltage commands and ON ratios of upper side arm elements of the respective phases with respect to the first voltage application device 3a, according to the first embodiment of this invention. FIG. 7A shows the first voltage commands Vu1, Vv1, Vw1 shown in FIGS. 6A and 6B, which are output by the coordinate converter 10a. FIG. 7B shows the first voltage commands Vu1', Vv1', Vw1' serving as the output of the offset calculator 11a, which are calculated using Equations (1) to (3).

The offset voltage Voffset1 of Equations (1) to (3) is given by Equation (7), shown below, using a maximum value Vmax1 and a minimum value Vmin1 of the first voltage commands Vu1, Vv1, Vw1.

$$V\text{offset1}=-0.5\ (V\text{min1}+V\text{max1}) \quad (7)$$

Note, however, that a voltage output range of a phase voltage that can be output by the first voltage application device 3a extends from zero to the bus voltage Vdc1. Therefore, when the first voltage commands Vu1', Vv1', Vw1' are smaller than −0.5 Vdc1 or exceed 0.5 Vdc1, the first voltage commands Vu1', Vv1', Vw1' are limited to −0.5 Vdc1 or 0.5 Vdc1 so that the width of the voltage output range remains within the voltage Vdc1 that can be output by the first voltage application device 3a.

Further, Voffset1 may be determined using another offset voltage calculation method such as a two phase modulation method or a third harmonic wave superimposing method instead of Equation (7).

FIG. 7C shows ON duties Dsup1, Dsvp1, Dswp1 denoting the ON ratios of the upper side arm elements (Sup1, Svp1, Swp1) of the respective phases in the first voltage application device 3a. These ON duties Dsup1, Dsvp1, Dswp1 are determined using Vu1', Vv1', Vw1', respectively, from $$Dsxp1=0.5+Vx1'/Vdc1$$

where X=U, V, W. When Dsup1 is 0.6, for example, the first voltage application device 3a sets the ON ratio of Sup1 within the switching period Tsw at 0.6.

In the first voltage application device 3a, either the upper side arm element (Sup1, Svp1, Swp1) or a lower side arm element (Sun1, Svn1, Swn1) is switched ON at all times in each phase. Accordingly, relationships shown below in Equations (8) to (10) are established between the ON duties (Dsup1, Dsvp1, Dswp1) of the upper side arm elements of the respective phases and ON duties (Dsun1, Dsvn1, Dswn1) of the lower side arm elements.

$$Dsup1+Dsun1=1 \quad (8)$$

$$Dsvp1+Dsvn1=1 \quad (9)$$

$$Dswp1+Dswn1=1 \quad (10)$$

In accordance with Equation (8), therefore, when Dsup1 is 0.6, for example, Dsun1 is 0.4. Thus, the ON duties of the respective switching elements in the first voltage application device 3a are determined on the basis of the first voltage commands Vu1', Vv1', Vw1'.

Figures 8A, 8B, 8C:
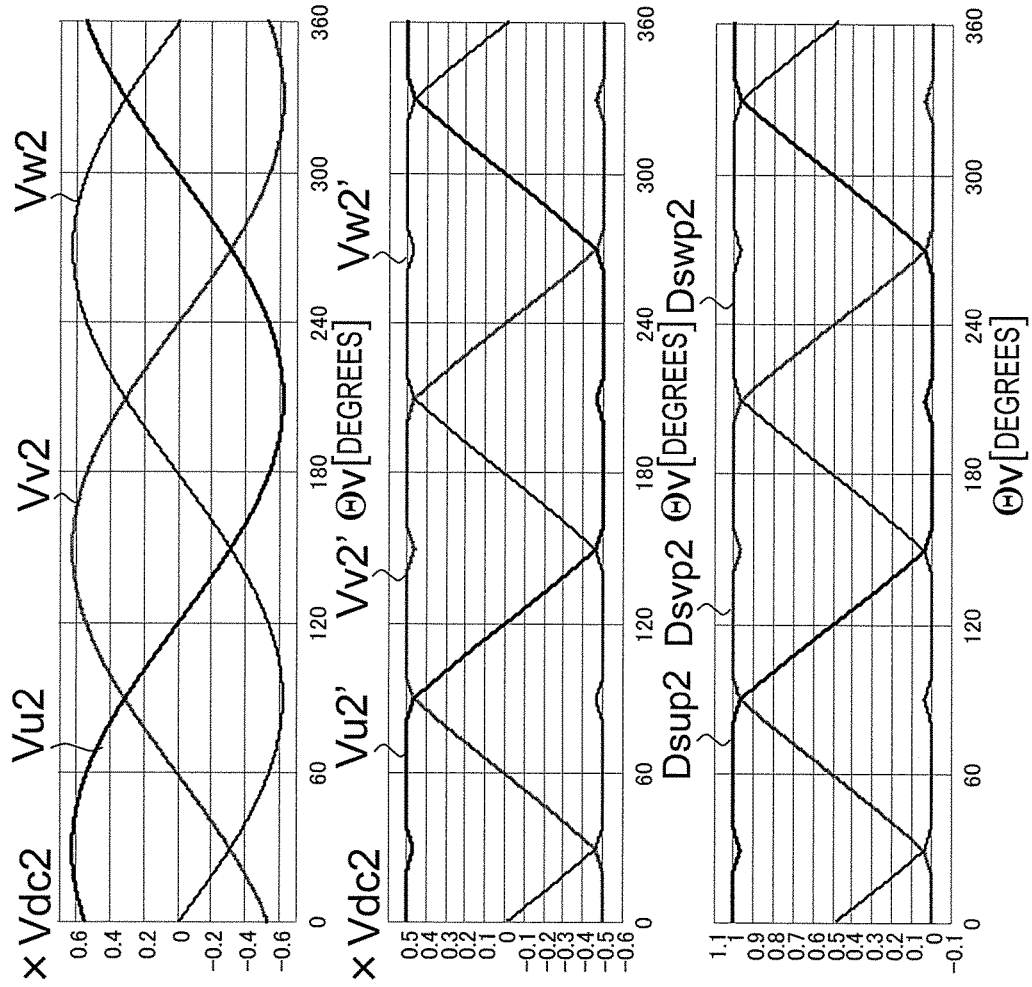
FIGS. 8A-8C are views illustrating relationships between the voltage commands and the ON ratios of the upper side arm elements of the respective phases with respect to a second voltage application device, according to the first embodiment of this invention.

FIGS. 8A-8C are views illustrating relationships between the voltage commands and the ON ratios of the upper side arm elements of the respective phases with respect to the second voltage application device 3b, according to the first embodiment of this invention. FIG. 8A shows the second voltage commands Vu2, Vv2, Vw2 shown in FIGS. 6A and 6B, which are output by the coordinate converter 10b. FIG. 8B shows the second voltage commands Vu2', Vv2', Vw2' serving as the output of the offset calculator 11b, which are calculated using Equations (4) to (6).

The offset voltage Voffset2 of Equations (4) to (6) is given by Equation (11), shown below, using a maximum value Vmax2 and a minimum value Vmin2 of the second voltage commands Vu2, Vv2, Vw2.

$$V\text{offset2}=-0.5\ (V\text{min2}+V\text{max2}) \quad (11)$$

Note, however, that the voltage output range of the phase voltage that can be output by the second voltage application device 3b extends from zero to the bus voltage Vdc2. Therefore, when the second voltage commands Vu2', Vv2', Vw2' are smaller than −0.5 Vdc2 or exceed 0.5 Vdc2, the second voltage commands Vu2', Vv2', Vw2' are limited to −0.5 Vdc2 or 0.5 Vdc2 so that the width of the voltage output range remains within the voltage Vdc2 that can be output by the second voltage application device 3b.

Further, Voffset2 may be determined using another offset voltage calculation method such as a two phase modulation method or a third harmonic wave superimposing method instead of Equation (11).

FIG. 8C shows ON duties Dsup2, Dsvp2, Dswp2 denoting the ON ratios of the upper side arm elements (Sup2, Svp2, Swp2) of the respective phases in the second voltage application device 3b. These ON duties Dsup2, Dsvp2, Dswp2 are determined using Vu2', Vv2', Vw2', respectively, from $$Dsxp2=0.5+Vx2'/Vdc2$$

where, X=U, V, W. When Dsup2 is 0.6, for example, the second voltage application device 3b sets the ON ratio of Sup2 within the switching period Tsw at 0.6.

In the second voltage application device 3b, either the upper side arm element (Sup2, Svp2, Swp2) or a lower side arm element (Sun2, Svn2, Swn2) is switched ON at all times in each phase. Accordingly, relationships shown below in Equations (12) to (14) are established between the ON duties (Dsup2, Dsvp2, Dswp2) of the upper side arm elements of the respective phases and ON duties (Dsun2, Dsvn2, Dswn2) of the lower side arm elements.

$$Dsup2+Dsun2=1 \quad (12)$$

$$Dsvp2+Dsvn2=1 \quad (13)$$

$$Dswp2+Dswn2=1 \quad (14)$$

In accordance with Equation (12), therefore, when Dsup2 is 0.6, for example, Dsun2 is 0.4. Thus, the ON duties of the respective switching elements in the second voltage application device 3b are determined on the basis of the second voltage commands Vu2', Vv2', Vw2'.

Figure 9:
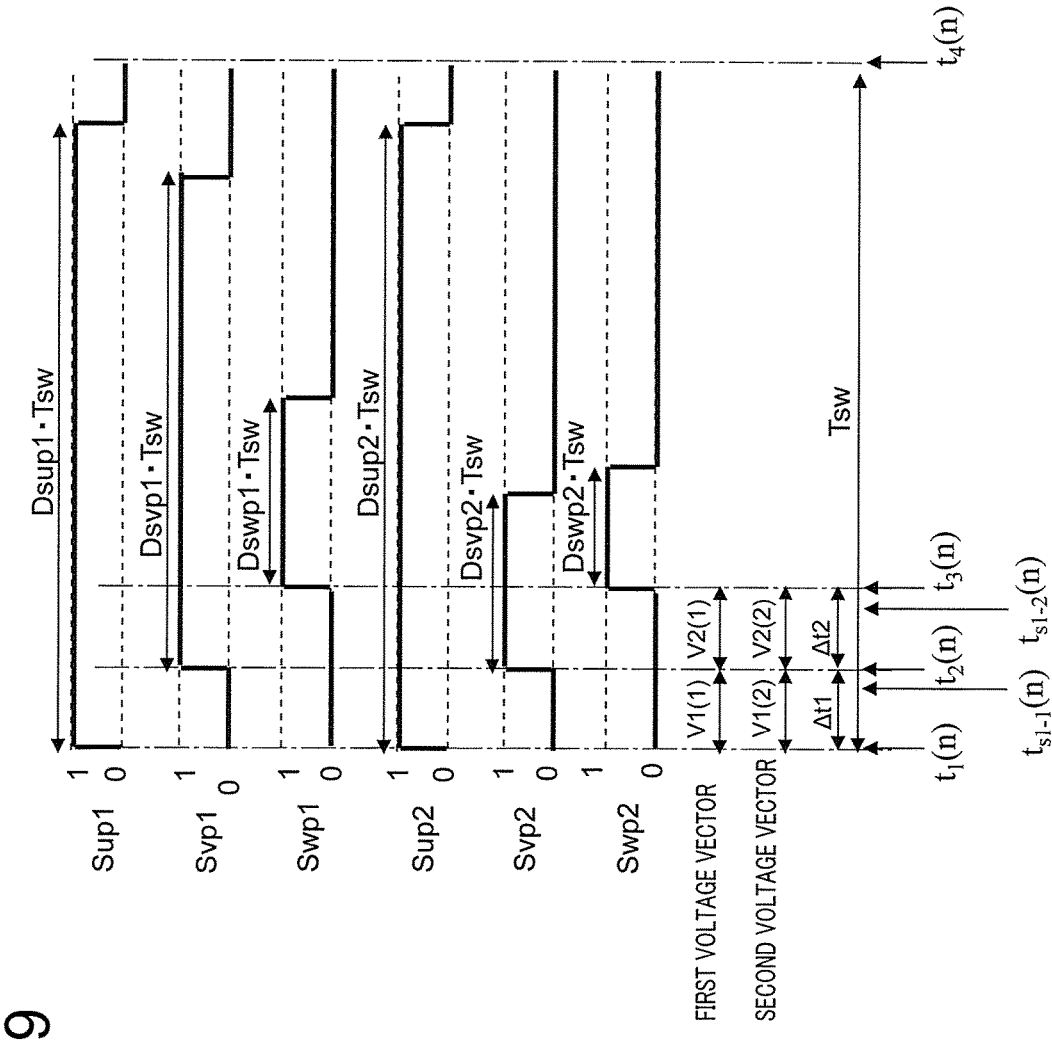
FIG. 9 is an operational diagram relating to ON/OFF patterns of the semiconductor switches and current detection timings of current detectors 4a, 4b, according to the first embodiment of this invention.

FIG. 9 is an operational diagram relating to ON/OFF patterns of the semiconductor switches and current detection timings of the current detectors 4a, 4b, according to the first embodiment of this invention. More specifically, FIG. 9 is a view showing relationships between the ON/OFF patterns of the semiconductor switches Sup1, Svp1, Swp1 of the first voltage application device 3a and the semiconductor switches Sup2, Svp2, Swp2 of the second voltage application device 3b and the current detection timings of the current detectors 4a, 4b within the period (a PWM period) Tsw of a switching signal.

Note that Sun1, Svn1, Swn1 and Sun2, Svn2, Swn2 have inverse relationships to Sup1, Svp1, Swp1 and Sup2, Svp2, Swp2, respectively (i.e. 0 in place of 1 and 1 in place of 0, excluding a dead time period), and are not therefore shown in the drawing.

In FIG. 9, when a first maximum phase voltage Emax1, a first intermediate phase voltage Emid1, and a first minimum phase voltage Emin1 are set in descending order in relation to the first voltage commands Vu1', Vv1', Vw1', relationships shown below in Equations (15) to (17) are assumed to be established.

$$Emax1=Vu1' \quad (15)$$

$$Emid1=Vv1' \quad (16)$$

$$Emin1=Vw1' \quad (17)$$

Similarly, when a second maximum phase voltage Emax2, a second intermediate phase voltage Emid2, and a second minimum phase voltage Emin2 are set in descending order in relation to the second voltage commands Vu2', Vv2', Vw2', relationships shown below in Equations (18) to (20) are assumed to be established.

$$Emax2=Vu2' \quad (18)$$

$$Emid2=Vv2' \quad (19)$$

$$Emin2=Vw2' \quad (20)$$

At a time t1($n$), Sup1 and Sup2 are set at 1 and Svp1, Swp1, Svp2, and Swp2 are set at 0, and this condition is maintained until a time t2($n$) following the elapse of Δt1 from the time t1($n$). In accordance with FIGS. 3 and 4, the first voltage vector and the second voltage vector are at V1(1) and V1(2), respectively, between the times t1($n$) and t2($n$). The current detectors 4a, 4b detect Idc1 and Idc2 at a time ts1-1($n$) between the times t1($n$) and t2($n$).

When a sum of a dead time of the first voltage application device 3a or the second voltage application device 3b and a time required for the first current detector to detect Idc1 or for the second current detector to detect Idc2 (for example, a time required for ringing included in a detected waveform to converge and a sample holding time) is set as a "first predetermined value", the time shift Δt1 is set to equal or exceed the "first predetermined value".

In accordance with FIG. 3, the first voltage vector is at V1(1) between the times t1($n$) and t2($n$), and therefore Idc1, detected at the time ts1-1($n$), is equal to Iu1. Further, in accordance with FIG. 4, the second voltage vector is at V1(2) between the times t1($n$) and t2($n$), and therefore Idc2, detected at the time ts1-1($n$), is equal to Iu2.

Next, at the time t2($n$), Svp1 and Svp2 are set at 1, and this switching pattern is maintained until a time t3($n$) following the elapse of Δt2 from the time t2($n$). In accordance with FIGS. 3 and 4, the first voltage vector and the second voltage vector are at V2(1) and V2(2), respectively, between the times t2($n$) and t3($n$). The current detectors 4a, 4b detect Idc1 and Idc2 again at a time ts1-2($n$) between the times t2($n$) and t3($n$). The time shift Δt2, similarly to the time shift Δt1, is set to equal or exceed the "first predetermined value".

In accordance with FIG. 3, the first voltage vector is at V2(1) between the times t2($n$) and t3($n$), and therefore Idc1, detected at the time ts1-2($n$), is equal to −Iw1. Further, in accordance with FIG. 4, the second voltage vector is at V2(2) between the times t2($n$) and t3($n$), and therefore Idc2, detected at the time ts1-2($n$), is equal to −Iw2.

Hence, the currents Iu1, Iw1 of the first windings and the currents Iu2, Iw2 of the second windings can be detected in the manner described above, and therefore first three-phase currents Iu1, Iv1 (=−Iu1−Iw1), Iw1 and second three-phase currents Iu2, Iv2 (=−Iu2−Iw2), Iw2 can be detected using the fact that the sum of the currents of the three phases is zero.

At the time t3($n$), Swp1 and Swp2 are set at 1. Respective pulse widths (periods during which "1" is maintained) of Sup1 to Swp2 are determined from products of the ON duties Dsup1 to Dswp2 corresponding to the respective switches and the switching period Tsw.

In the first embodiment, as described above, the switch of the upper side arm element of the phase corresponding to the first maximum phase voltage Emax1, the switch of the upper side arm element of the phase corresponding to the first intermediate phase voltage Emid1, and the switch of the upper side arm element of the phase corresponding to the first minimum phase voltage Emin1 are switched ON in that order at time shifts of Δt1 or Δt2, which are set to equal or exceed the first predetermined value.

By performing switching in this manner, the two first voltage vectors shown in FIG. 3, with which two phases of the first three-phase currents Iu1, Iv1, Iw1 can be detected from Idc1, are formed and the two second voltage vectors shown in FIG. 4, with which two phases of the second three-phase currents Iu2, Iv2, Iw2 can be detected from Idc2, are formed.

Depending on the voltage command value of the phase corresponding to the first intermediate phase voltage Emid1, however, it may be impossible to form the two first voltage vectors with which two phases of the first three-phase currents Iu1, Iv1, Iw1 can be detected from Idc1, and as a result, it may be impossible to detect the first three-phase currents Iu1, Iv1, Iw1.

Figure 10:
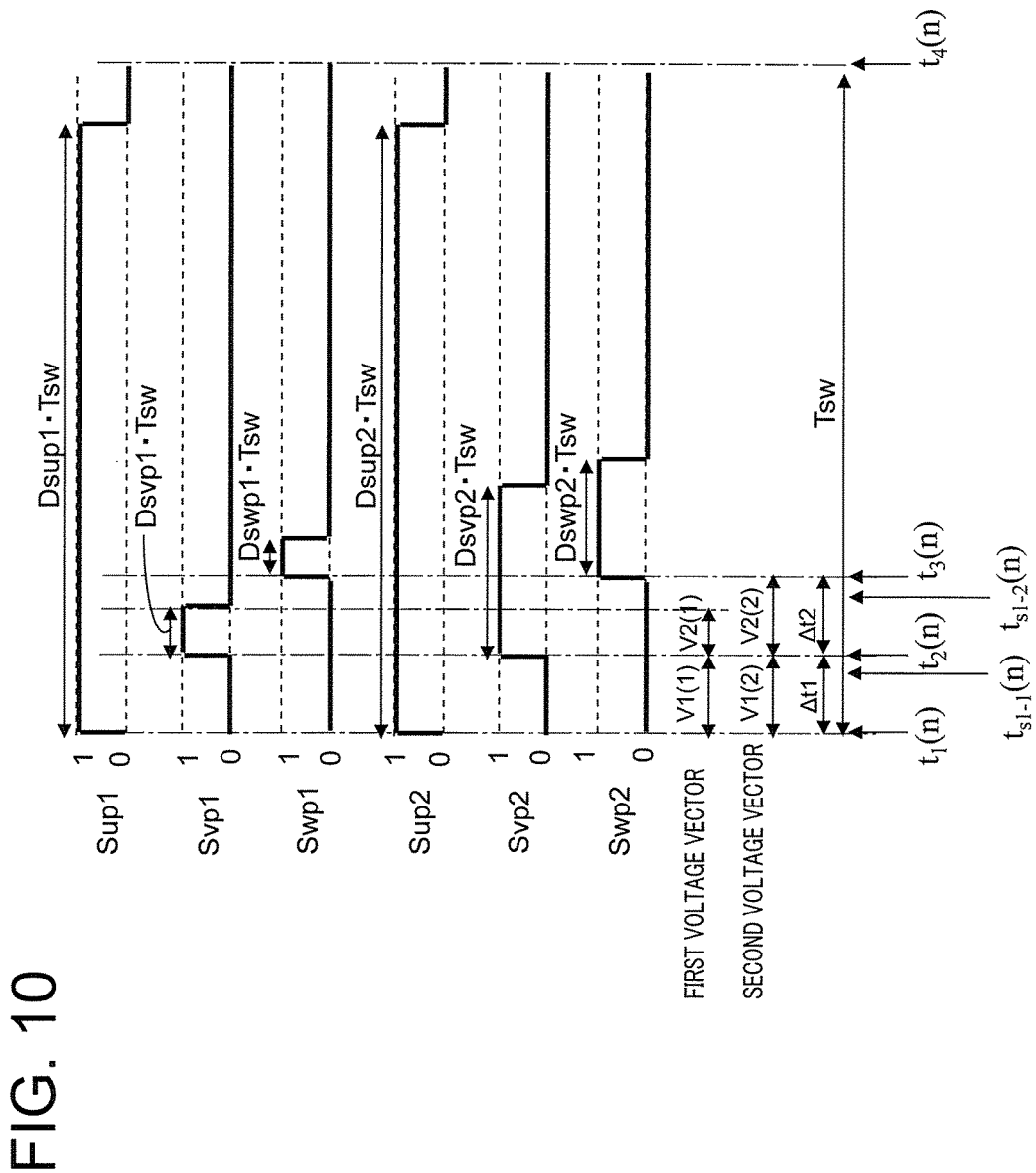
FIG. 10 is a different operational diagram to FIG. 9 relating to the ON/OFF patterns of the semiconductor switches and the current detection timings of the current detectors according to the first embodiment of this invention.

For example, FIG. 10 is a different operational diagram to FIG. 9 relating to the ON/OFF patterns of the semiconductor switches and the current detection timings of the current detectors 4a, 4b according to the first embodiment of this invention. FIG. 10 shows an example of a case in which the first three-phase currents Iu1, Iv1, Iw1 cannot be detected.

FIG. 10 shows a condition in which Vv1' is small such that Dsvp1×Tsw is smaller than Δt2. When Svp1 is switched ON at the time t2(n) in this condition, Svp1 is switched OFF before the time t3(n), and therefore the first voltage vector V2(1) cannot be formed over the duration of the time shift Δt2.

Figure 11:
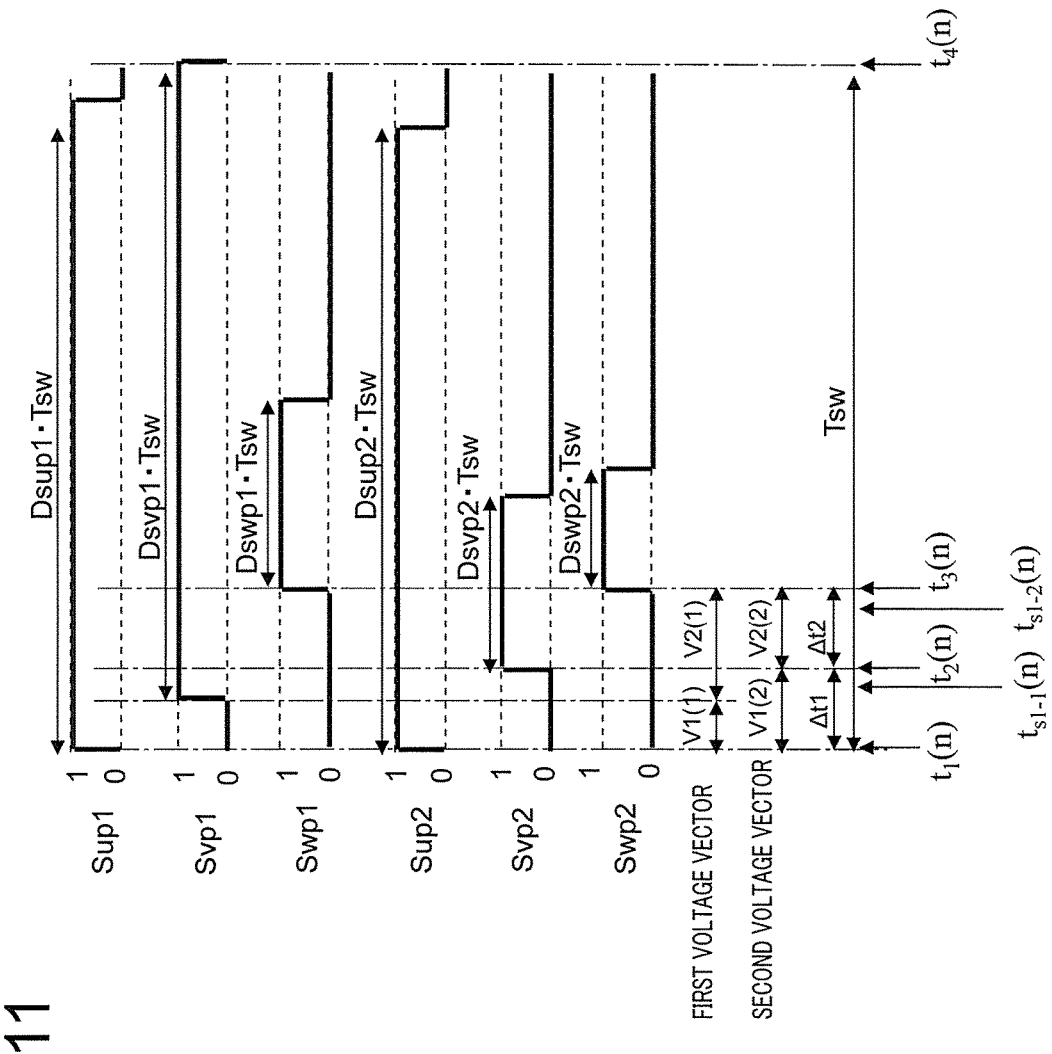
FIG. 11 is a different operational diagram to FIGS. 9 and 10 relating to the ON/OFF patterns of the semiconductor switches and the current detection timings of the current detectors according to the first embodiment of this invention.

Further, FIG. 11 is a different operational diagram to FIGS. 9 and 10 relating to the ON/OFF patterns of the semiconductor switches and the current detection timings of the current detectors 4a, 4b according to the first embodiment of this invention. Similarly to FIG. 10, FIG. 11 shows an example of a case in which the first three-phase currents Iu1, Iv1, Iw1 cannot be detected.

FIG. 11 shows a condition in which Vv1' is large such that Dsvp1×Tsw is larger than Tsw−Δt1. In this condition, even when Svp1 is switched OFF at a time t4(n) at which the switching period Tsw ends, a pulse width corresponding to Dsvp1×Tsw cannot be obtained unless Svp1 is switched ON before the time t2(n). As a result, V1(1) cannot be formed over the duration of the time shift Δt1.

Figure 12:
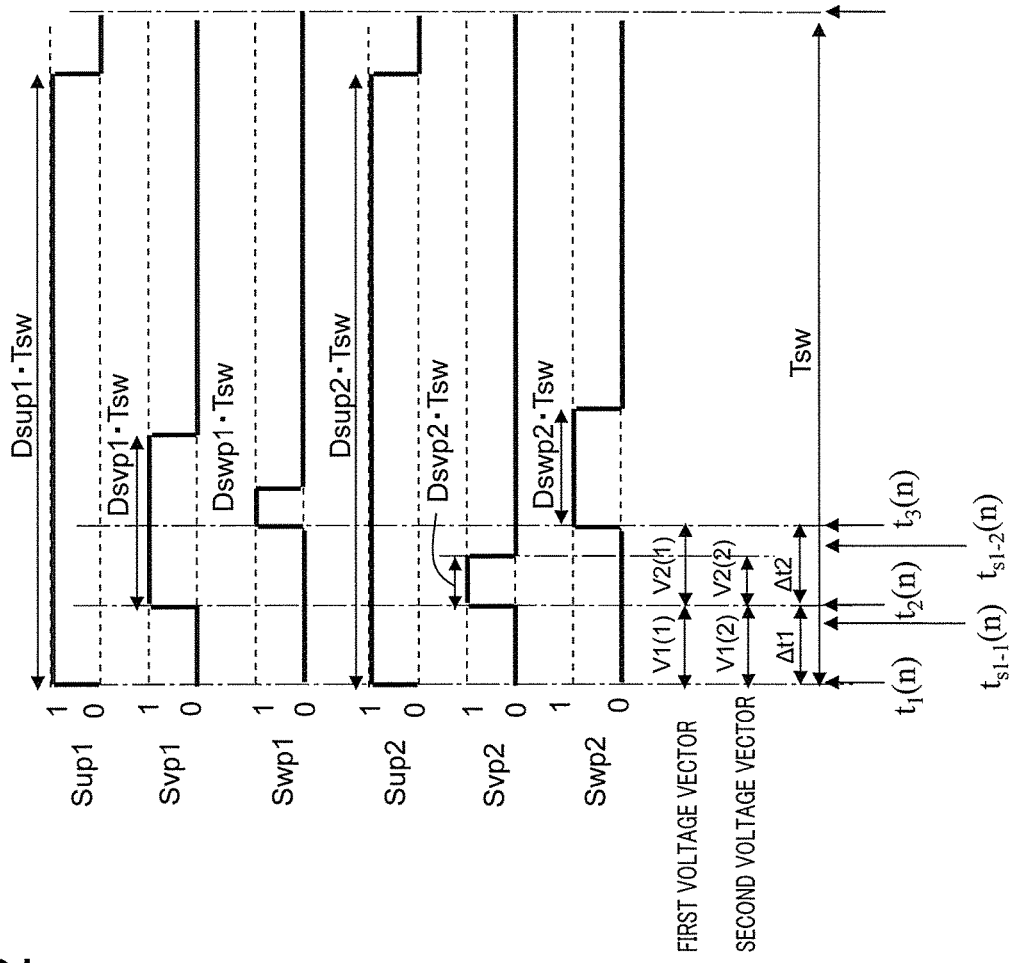
FIG. 12 is a different operational diagram to FIGS. 10 and 11 relating to the ON/OFF patterns of the semiconductor switches and the current detection timings of the current detectors according to the first embodiment of this invention.

FIG. 12 is a different operational diagram to FIGS. 10 and 11 relating to the ON/OFF patterns of the semiconductor switches and the current detection timings of the current detectors 4a, 4b according to the first embodiment of this invention. FIG. 12 shows an example of a case in which the second three-phase currents Iu2, Iv2, Iw2 cannot be detected. As shown in FIG. 12, likewise with regard to the second voltage application device 3b, when Vv2' is small, V2(2) cannot be formed over the duration of the time shift Δt2.

Figure 13:
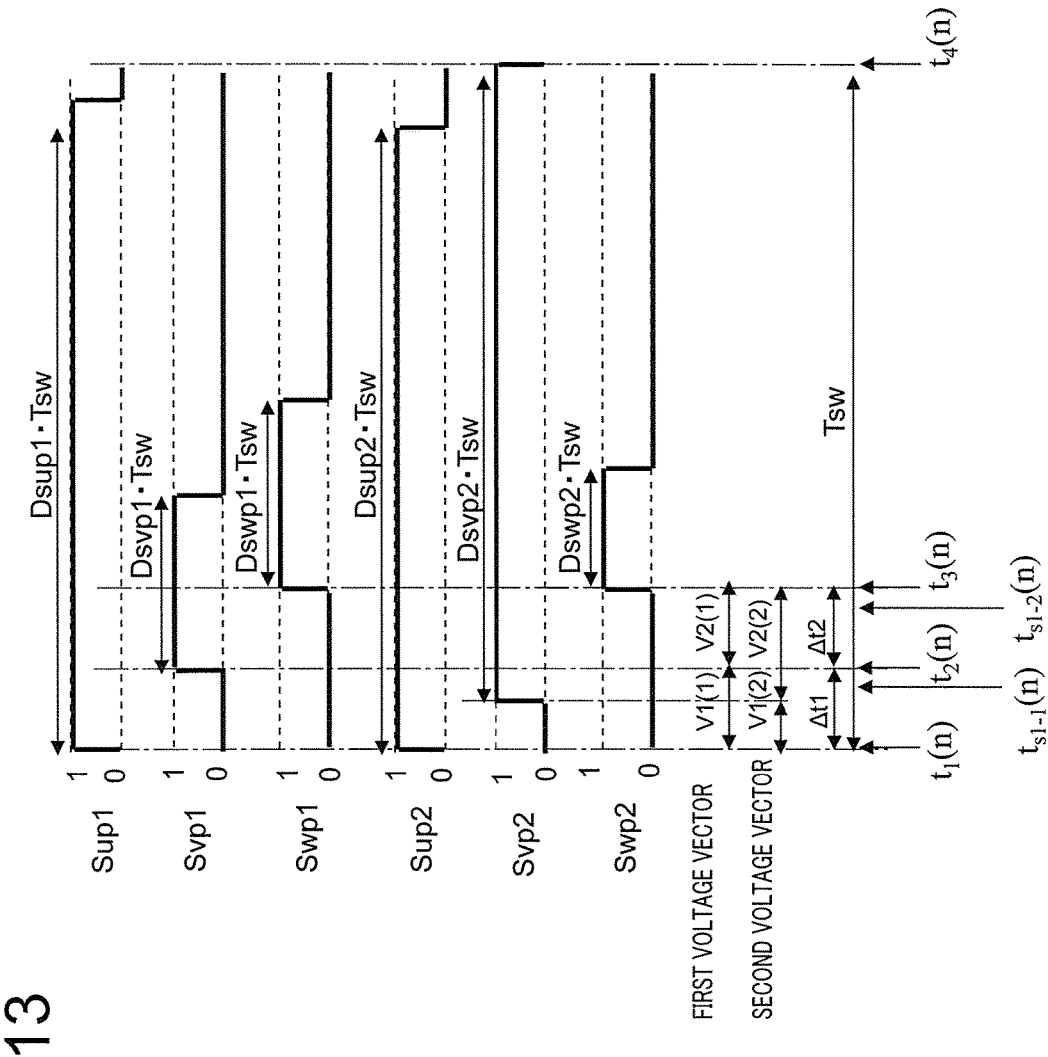
FIG. 13 is a different operational diagram to FIG. 12 relating to the ON/OFF patterns of the semiconductor switches and the current detection timings of the current detectors according to the first embodiment of this invention.

Further, FIG. 13 is a different operational diagram to FIG. 12 relating to the ON/OFF patterns of the semiconductor switches and the current detection timings of the current detectors 4a, 4b according to the first embodiment of this invention. FIG. 13 shows an example of a case in which the second three-phase currents Iu2, Iv2, Iw2 cannot be detected. As shown in FIG. 13, when Vv2' is large, V1(2) cannot be formed over the duration of the time shift Δt1.

This problem can be solved by increasing the switching period Tsw described in PTL 1 (referred to as the control period in PTL 1). When the time shift Δt1 and the time shift Δt2 are set at fixed times, the proportion of Tsw occupied by the time shift Δt1 and the time shift Δt2 can be reduced by increasing Tsw. As a result, current detection can be performed even when the intermediate phase voltage is small such that Dsvp1 is small or when the intermediate phase voltage is large such that Dsvp1 is large, as described above.

However, when Tsw is increased, a switching frequency given by the inverse of Tsw decreases, and when this frequency enters the audible range, a problem occurs in that noise from the switching frequency component increases. When the AC rotary machine 1a is used as a motor for an electric power steering, for example, the switching frequency is set to be no lower than 20 kHz (i.e. outside the band of the audible range).

The reason for this is that the audible range of a human being is between 20 Hz and 20 kHz, and therefore, by setting the switching frequency to be no lower than 20 kHz (i.e. outside the band of the audible range), the sound of the switching frequency component cannot be heard by human ears. When the switching frequency is reduced below 20 kHz in order to secure the time shift Δt1 and the time shift Δt2, however, the sound of the switching frequency component can be heard by human ears as noise.

Moreover, when the method illustrated in FIGS. 10 to 13 is employed without increasing the switching period, another problem occurs. In FIG. 10, even when detection of Idc1 during Δt2 is abandoned, the OFF timing of Svp1 is between t2(n) and t3(n), and therefore approaches ts1-2(n), i.e. the detection timing of Idc2. Hence, noise may occur while detecting Idc2 due to the switching operation for switching Svp1 OFF, and as a result, it may be impossible to detect Idc2 correctly during Δt2.

Further, in FIG. 11, even when detection of Idc1 during Δt1 is abandoned, the ON timing of Svp1 is between t1(n) and t2(n), and therefore approaches ts1-1(n), i.e. the detection timing of Idc2. Hence, noise may occur while detecting Idc2 due to the switching operation for switching Svp1 ON, and as a result, it may be impossible to detect Idc2 correctly during Δt1.

Furthermore, in FIG. 12, even when detection of Idc2 during Δt2 is abandoned, the OFF timing of Svp2 is between t2(n) and t3(n), and therefore approaches ts1-2(n), i.e. the detection timing of Idc1. Hence, noise may occur while detecting Idc1 due to the switching operation for switching Svp2 OFF, and as a result, it may be impossible to detect Idc1 correctly during Δt2.

Moreover, in FIG. 13, even when detection of Idc2 during Δt1 is abandoned, the ON timing of Svp2 is between t1(n) and t2(n), and therefore approaches ts1-1(n), i.e. the detection timing of Idc1. Hence, noise may occur while detecting Idc1 due to the switching operation for switching Svp2 ON, and as a result, it may be impossible to detect Idc1 correctly during Δt1.

Further, when, in response to this problem, an amplitude of the first voltage command is limited so that the first intermediate phase voltage Emid1 remains within a range in which the time shifts Δt1 and Δt2 can be secured, a further problem occurs in that the voltage applied to the AC rotary machine 1a is limited, with the result that a high output cannot be generated by the AC rotary machine 1a.

Hence, a technical feature of this invention is that Idc2 is detected with a high degree of precision even when it is accepted that Idc1 cannot be detected due to the magnitude of the first intermediate phase voltage Emid1, and Idc1 is detected with a high degree of precision even when it is accepted that Idc2 cannot be detected due to the magnitude of the second intermediate phase voltage Emid2.

ON/OFF patterns applied to the semiconductor switches Sup1 to Swn1 and Sup2 to Swn2 for this purpose will be described below. Note that the problems illustrated in FIGS. 12 and 13 are similar to the problems illustrated in FIGS. 10 and 11, and therefore a method for solving the problems illustrated in FIGS. 10 and 11 will be described specifically below.

Figure 14:
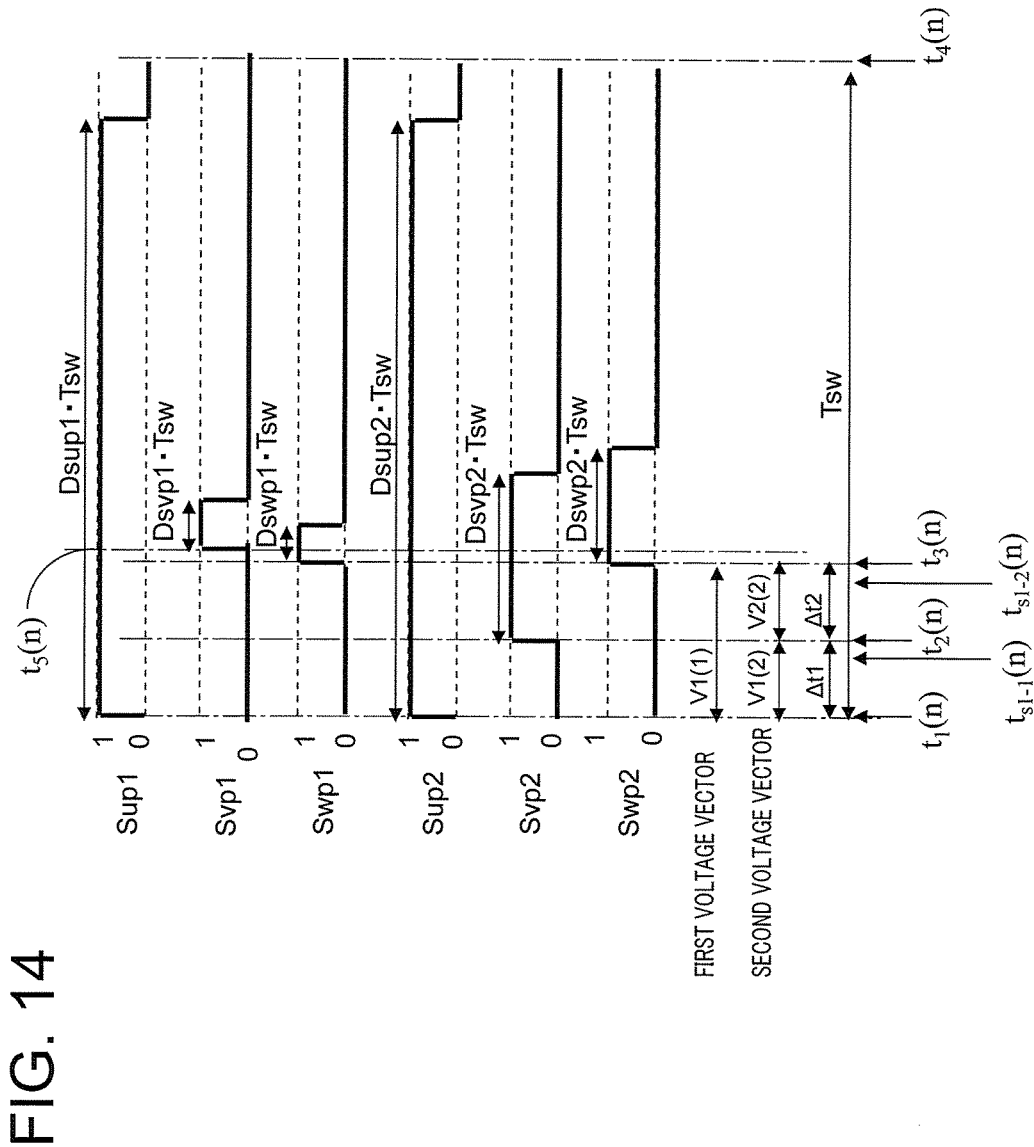
FIG. 14 is an operational diagram relating to the ON/OFF patterns of the semiconductor switches and the current detection timings of the current detectors according to the first embodiment of this invention.

FIG. 14 is an operational diagram relating to the ON/OFF patterns of the semiconductor switches and the current detection timings of the current detectors 4a, 4b according to the first embodiment of this invention. FIG. 14 shows an operation for solving the problem illustrated in FIG. 10. More specifically, in FIG. 14, the ON timing of Svp1 is shifted from t2(n) in FIG. 10 to t5(n).

t5(n) is set to be within a "second predetermined value" of the timing t3(n) at which the first minimum phase voltage is switched ON. Here, the "second predetermined value" is a smaller value than the "first predetermined value", and a smaller value than an interval between ts1-2(n), which serves as a bus current detection timing, and t3(n), i.e. the ON timing of the first minimum phase voltage. Note that t3(n) and t5(n) may be set to match, or in other words such that the first intermediate phase voltage and the first minimum phase voltage are switched ON simultaneously.

When the ON time of the first intermediate phase voltage takes a value that is equal to or smaller than Δt2, as illustrated above in FIG. 10, the ON time of the first intermediate phase voltage is set to be within the second predetermined value of the ON time of the first minimum phase voltage, as shown in FIG. 14. Hence, with the configuration shown in FIG. 14, the first voltage application device 3a does not perform switching in the vicinity of ts1-2(n), and as a result, Idc2 can be detected at ts1-2(n) with a higher degree of precision than in FIG. 10.

Figure 15:
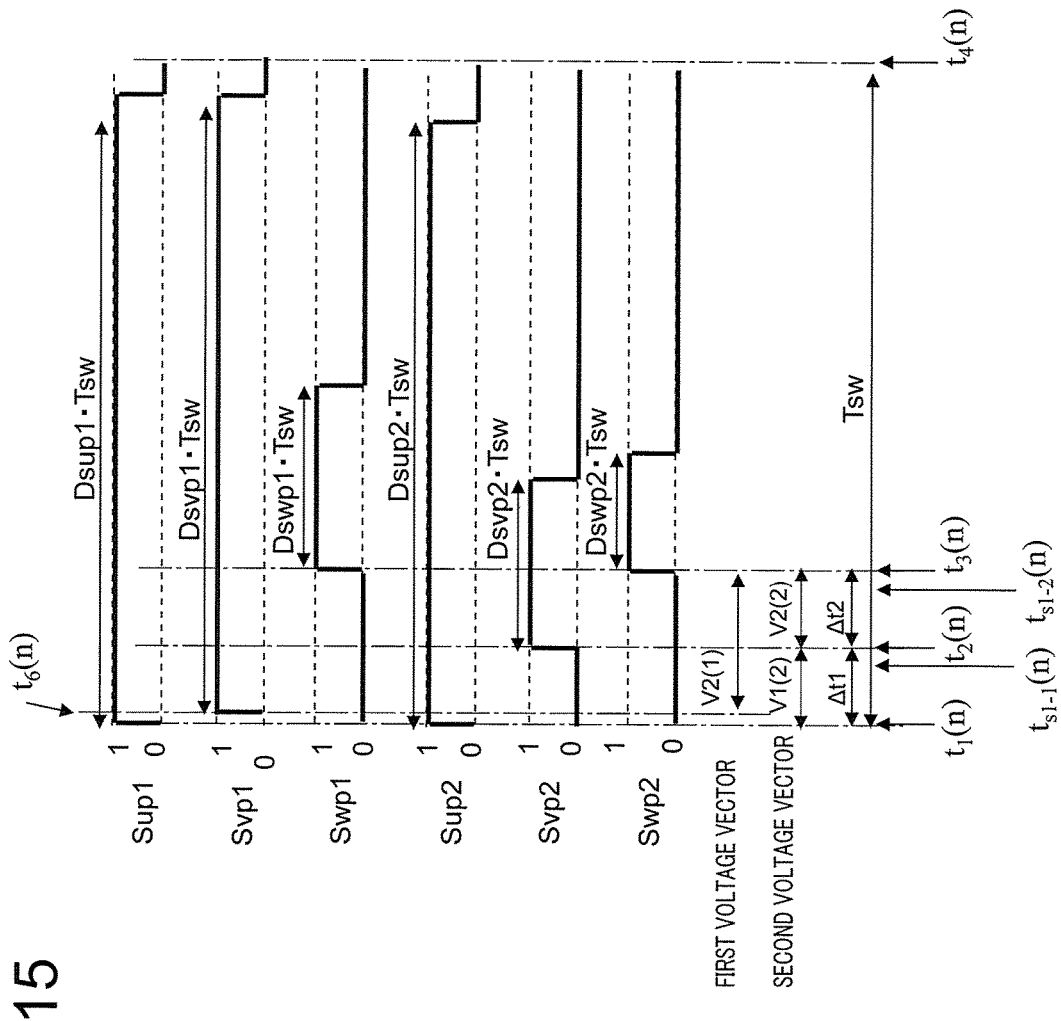
FIG. 15 is an operational diagram relating to the ON/OFF patterns of the semiconductor switches and the current detection timings of the current detectors according to the first embodiment of this invention.

FIG. 15 is an operational diagram relating to the ON/OFF patterns of the semiconductor switches and the current detection timings of the current detectors 4a, 4b according to the first embodiment of this invention. FIG. 15 shows an operation for solving the problem illustrated in FIG. 11. More specifically, in FIG. 15, the ON timing of Svp1 is shifted from t2(n) in FIG. 11 to t6(n).

t6(n) is set to be within the "second predetermined value" of the timing t1(n) at which the first maximum phase voltage is switched ON. Note that t1(n) and t6(n) may be set to match, or in other words such that the first intermediate phase voltage and the first maximum phase voltage are switched ON simultaneously.

When the ON time of the first intermediate phase voltage takes a value that is equal to or smaller than Δt2, as illustrated above in FIG. 11, the ON time of the first intermediate phase voltage is set to be within the second predetermined value of the ON time of the first maximum phase voltage, as shown in FIG. 15. Hence, with the configuration shown in FIG. 15, the first voltage application device 3a does not perform switching in the vicinity of ts1-1(n), and as a result, Idc2 can be detected at ts1-1(n) with a higher degree of precision than in FIG. 11.

Figure 16:
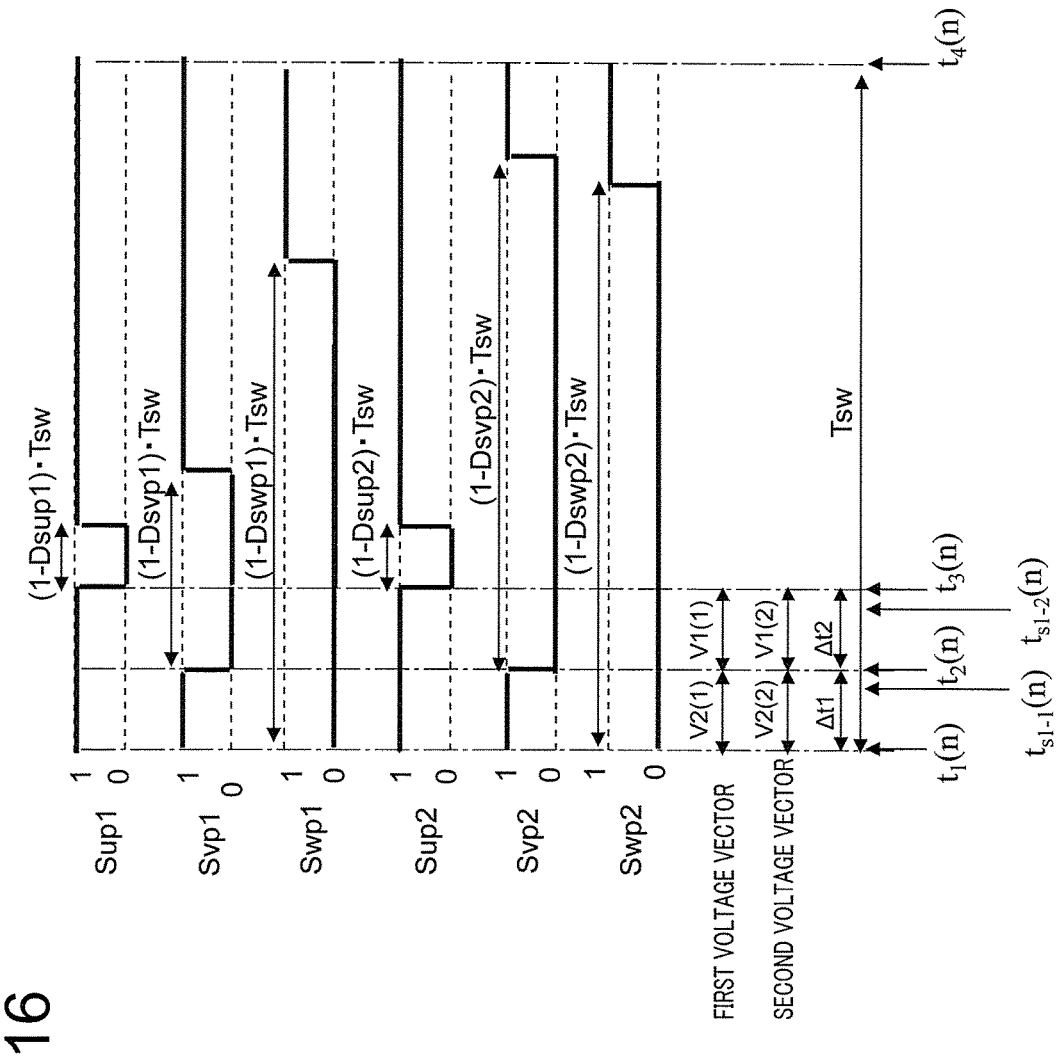
FIG. 16 is a different operational diagram to FIG. 9 relating to the ON/OFF patterns of the semiconductor switches and the current detection timings of the current detectors according to the first embodiment of this invention.

FIG. 16 is a different operational diagram to FIG. 9 relating to the ON/OFF patterns of the semiconductor switches and the current detection timings of the current detectors 4a, 4b according to the first embodiment of this invention.

In FIG. 16, similarly to FIG. 9, when the first maximum phase voltage Emax1, the first intermediate phase voltage Emid1, and the first minimum phase voltage Emin1 are set in descending order in relation to the first voltage commands Vu1', Vv1', Vw1', the relationships shown above in Equations (15) to (17) are assumed to be established, and when the second maximum phase voltage Emax2, the second intermediate phase voltage Emid2, and the second minimum phase voltage Emin2 are set in descending order in relation to the second voltage commands Vu2', Vv2', Vw2', the relationships shown above in Equations (18) to (20) are assumed to be established.

At the time t1(n), Sup1, Sup2, Svp1, and Svp2 are set at 1 and Swp1 and Swp2 are set at 0, and this condition is maintained until the time t2(n) following the elapse of Δt1 from the time t1(n). In accordance with FIGS. 3 and 4, the first voltage vector and the second voltage vector are at V2(1) and V2(2), respectively, between the times t1(n) and t2(n). The current detectors 4a, 4b detect Idc1 and Idc2 at the time ts1-1(n) between the times t1(n) and t2(n).

In accordance with FIG. 3, the first voltage vector is at V2(1) between the times t1(n) and t2(n), and therefore Idc1, detected at the time ts1-1(n), is equal to −Iw1. Further, in accordance with FIG. 4, the second voltage vector is at V2(2) between the times t1(n) and t2(n), and therefore Idc2, detected at the time ts1-1(n), is equal to −Iw2.

Next, at the time t2(n), Svp1 and Svp2 are set at 0, and this switching pattern is maintained until the time t3(n) following the elapse of Δt2 from the time t2(n). In accordance with FIGS. 3 and 4, the first voltage vector and the second voltage vector are at V1(1) and V1(2), respectively, between the times t2(n) and t3(n). The current detectors 4a, 4b detect Idc1 and Idc2 again at the time ts1-2(n) between the times t2(n) and t3(n).

In accordance with FIG. 3, the first voltage vector is at V1(1) between the times t2(n) and t3(n), and therefore Idc1, detected at the time ts1-2(n), is equal to Iu1. Further, in accordance with FIG. 4, the second voltage vector is at V1(2) between the times t2(n) and t3(n), and therefore Idc2, detected at the time ts1-2(n), is equal to Iu2.

Hence, the currents Iu1, Iw1 of the first windings and the currents Iu2, Iw2 of the second windings can be detected in the manner described above, and therefore the first three-phase currents Iu1, Iv1 (=−Iu1−Iw1), Iw1 and the second three-phase currents Iu2, Iv2 (=−Iu2−Iw2), Iw2 can be detected using the fact that the sum of the currents of the three phases is zero.

At the time t3(n), Sup1 and Sup2 are set at 1. Respective times during which Sup1 to Swp2 are maintained at "0" are determined from products of the switching period Tsw and values obtained by subtracting the ON duties Dsup1 to Dswp2 corresponding to the respective switches from 1.

In another example of the first embodiment, as described above, the switch of the upper side arm element of the phase corresponding to the first minimum phase voltage Emin1, the switch of the upper side arm element of the phase corresponding to the first intermediate phase voltage Emid1, and the switch of the upper side arm element of the phase corresponding to the first maximum phase voltage Emax1 are switched OFF in that order at time shifts of Δt1 or Δt2, which are set to equal or exceed the first predetermined value.

By performing switching in this manner, the two first voltage vectors shown in FIG. 3, with which two phases of the first three-phase currents Iu1, Iv1, Iw1 can be detected from Idc1, are formed and the two second voltage vectors shown in FIG. 4, with which two phases of the second three-phase currents Iu2, Iv2, Iw2 can be detected from Idc2, are formed.

In the example operation shown in FIG. 16, however, similarly to the example operation shown in FIG. 9, depending on the voltage command value of the phase corresponding to the first intermediate phase voltage Emid1, it may be impossible to form the two first voltage vectors with which two phases of the first three-phase currents Iu1, Iv1, Iw1 can be detected from Idc1, and as a result, it may be impossible to detect the first three-phase currents Iu1, Iv1, Iw1.

Figure 17:
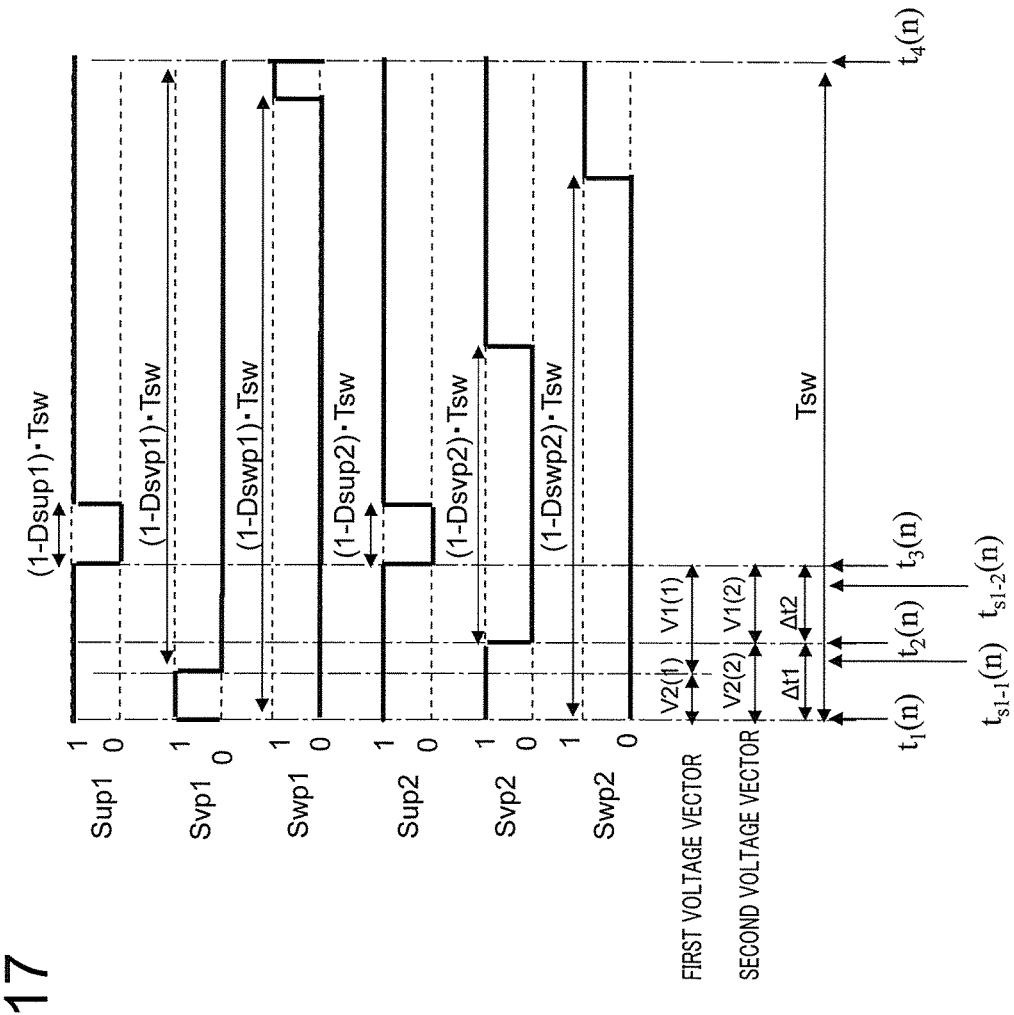
FIG. 17 is a different operational diagram to FIG. 16 relating to the ON/OFF patterns of the semiconductor switches and the current detection timings of the current detectors according to the first embodiment of this invention.

For example, FIG. 17 is a different operational diagram to FIG. 16 relating to the ON/OFF patterns of the semiconductor switches and the current detection timings of the current detectors 4a, 4b according to the first embodiment of this invention. FIG. 17 shows an example of a case in which the first three-phase currents Iu1, Iv1, Iw1 cannot be detected.

FIG. 17 shows a condition in which Vv1' is small such that Dsvp1×Tsw is smaller than Δt1. When Svp1 is switched ON at the time t1(n) in this condition, Svp1 is switched OFF before the time t2(n), and therefore the first voltage vector V2(1) cannot be formed over the duration of the time shift Δt1. As a result, Idc1 cannot be detected during Δt1.

Further, the OFF timing of Svp1 is between t1(n) and t2(n), and therefore approaches ts1-1(n), i.e. the detection timing of Idc2. Hence, noise may occur while detecting Idc2 due to the switching operation for switching Svp1 OFF, and as a result, it may be impossible to detect Idc2 correctly during Δt2.

Figure 18:
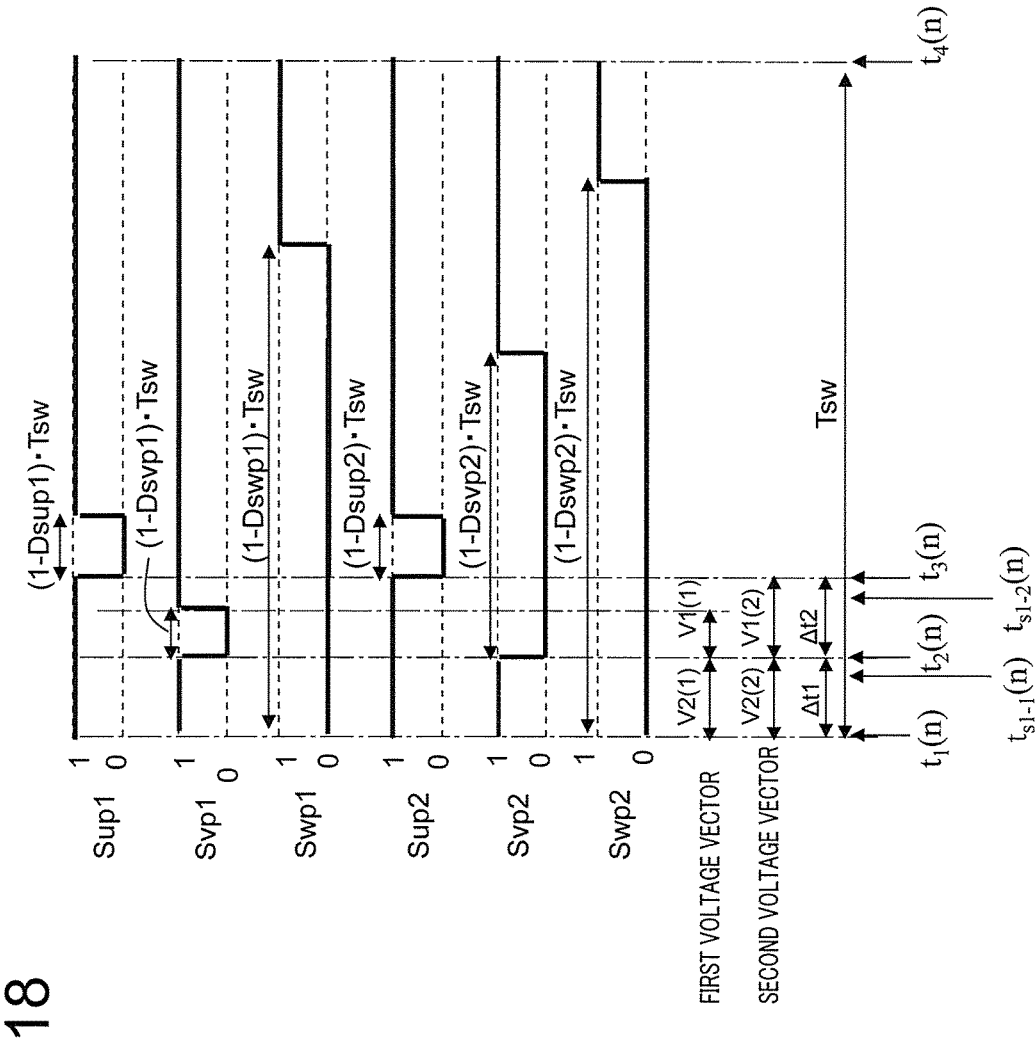
FIG. 18 is a different operational diagram to FIGS. 16 and 17 relating to the ON/OFF patterns of the semiconductor switches and the current detection timings of the current detectors according to the first embodiment of this invention.

Furthermore, FIG. 18 is a different operational diagram to FIGS. 16 and 17 relating to the ON/OFF patterns of the semiconductor switches and the current detection timings of the current detectors 4a, 4b according to the first embodiment of this invention. Similarly to FIG. 17, FIG. 18 shows an example of a case in which the first three-phase currents Iu1, Iv1, Iw1 cannot be detected.

FIG. 18 shows a condition in which Vv1' is large such that (1−Dsvp1)×Tsw, i.e. the OFF time of Svp1, is smaller than Δt2. Similarly to FIG. 12, when Svp1 is switched OFF at the time t2($n$) in this condition, Svp1 is switched ON before the time t3($n$), and therefore the first voltage vector V1(1) cannot be formed over the duration of the time shift Δt2. As a result, Idc1 cannot be detected during Δt2.

Further, the ON timing of Svp1 is between t2($n$) and t3($n$), and therefore approaches ts1-2($n$), i.e. the detection timing of Idc2. Hence, noise may occur while detecting Idc2 due to the switching operation for switching Svp1 ON, and as a result, it may be impossible to detect Idc2 correctly during Δt2.

Figure 19:
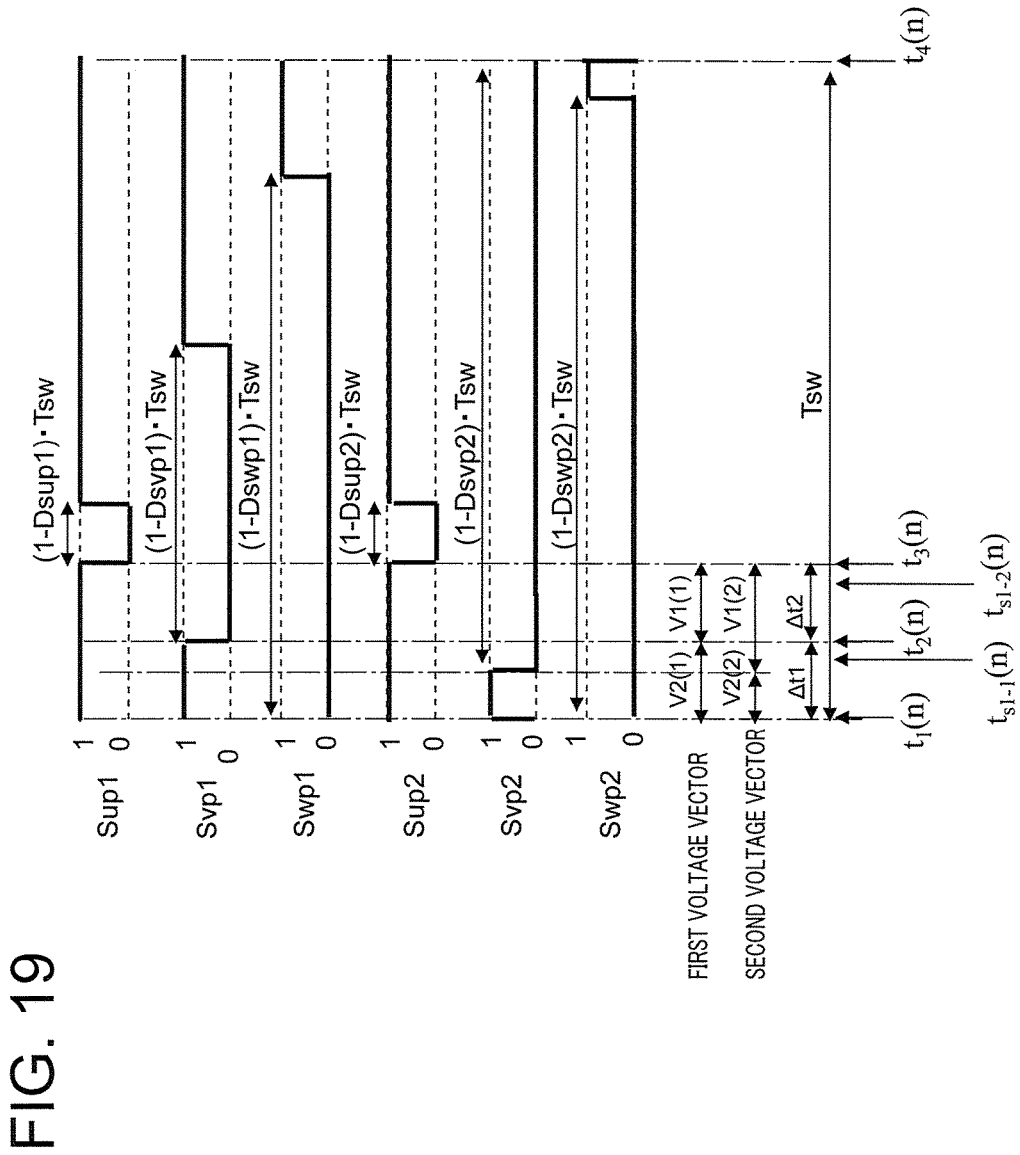
FIG. 19 is a different operational diagram to FIGS. 17 and 18 relating to the ON/OFF patterns of the semiconductor switches and the current detection timings of the current detectors according to the first embodiment of this invention.

FIG. 19 is a different operational diagram to FIGS. 17 and 18 relating to the ON/OFF patterns of the semiconductor switches and the current detection timings of the current detectors 4a, 4b according to the first embodiment of this invention. FIG. 19 shows an example of a case in which the second three-phase currents Iu2, Iv2, Iw2 cannot be detected. As shown in FIG. 19, likewise with regard to the second voltage application device 3b, when Vv2' is small, V2(2) cannot be formed over the duration of the shift time Δt1, and as a result, Idc2 cannot be detected during Δt1.

Further, the OFF timing of Svp2 is between t1($n$) and t2($n$), and therefore approaches ts1-1($n$), i.e. the detection timing of Idc1. Hence, noise may occur while detecting Idc1 due to the switching operation for switching Svp2 OFF, and as a result, it may be impossible to detect Idc1 correctly during Δt1.

Figure 20:
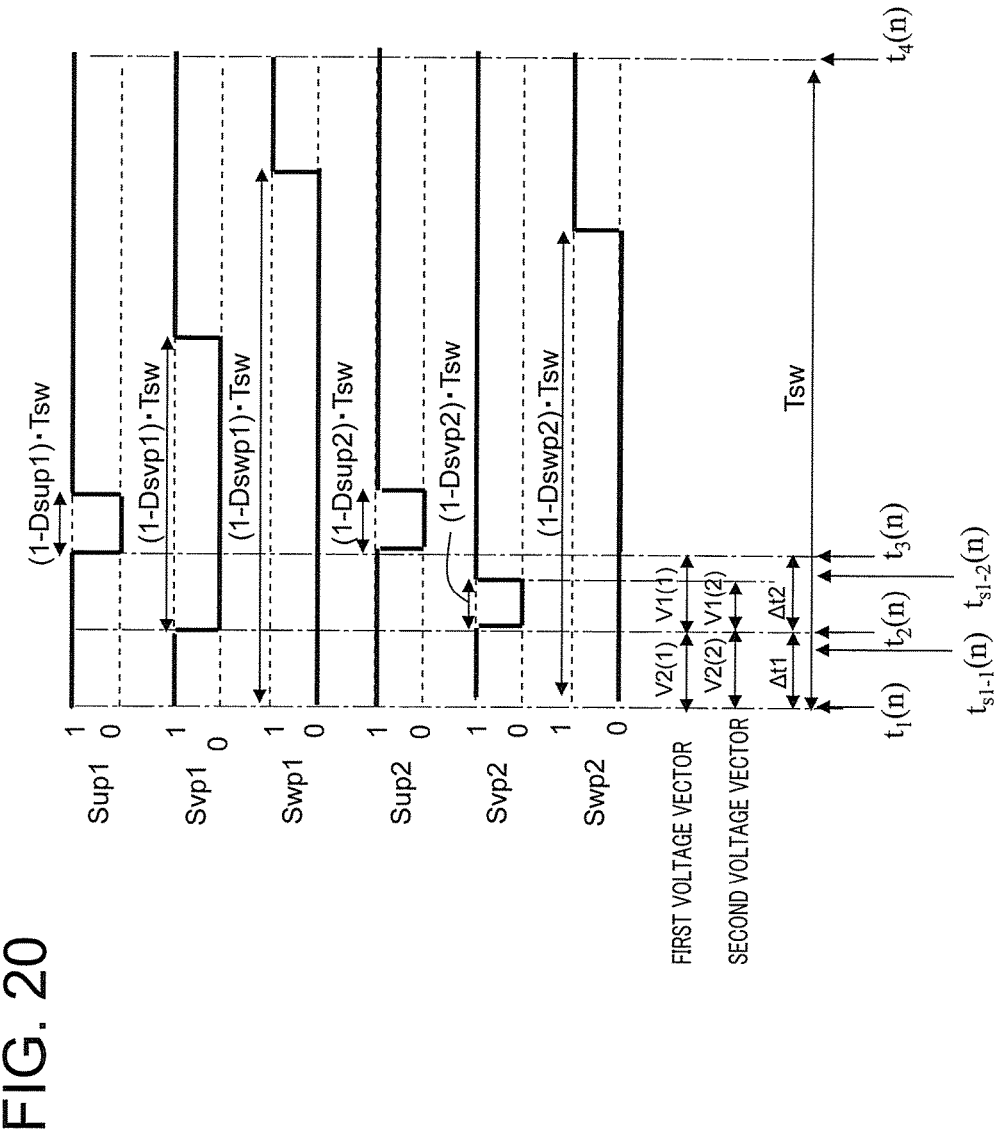
FIG. 20 is a different operational diagram to FIG. 19 relating to the ON/OFF patterns of the semiconductor switches and the current detection timings of the current detectors according to the first embodiment of this invention.

Furthermore, FIG. 20 is a different operational diagram to FIG. 19 relating to the ON/OFF patterns of the semiconductor switches and the current detection timings of the current detectors 4a, 4b according to the first embodiment of this invention. FIG. 20 shows an example of a case in which the second three-phase currents Iu2, Iv2, Iw2 cannot be detected. As shown in FIG. 20, when Vv2' is large, V1(2) cannot be formed over the duration of the shift time Δt2, and as a result, Idc2 cannot be detected during Δt2.

Further, the ON timing of Svp2 is between t2($n$) and t3($n$), and therefore approaches ts1-2($n$), i.e. the detection timing of Idc1. Hence, noise may occur while detecting Idc1 due to the switching operation for switching Svp2 ON, and as a result, it may be impossible to detect Idc1 correctly during Δt2.

Figure 21:
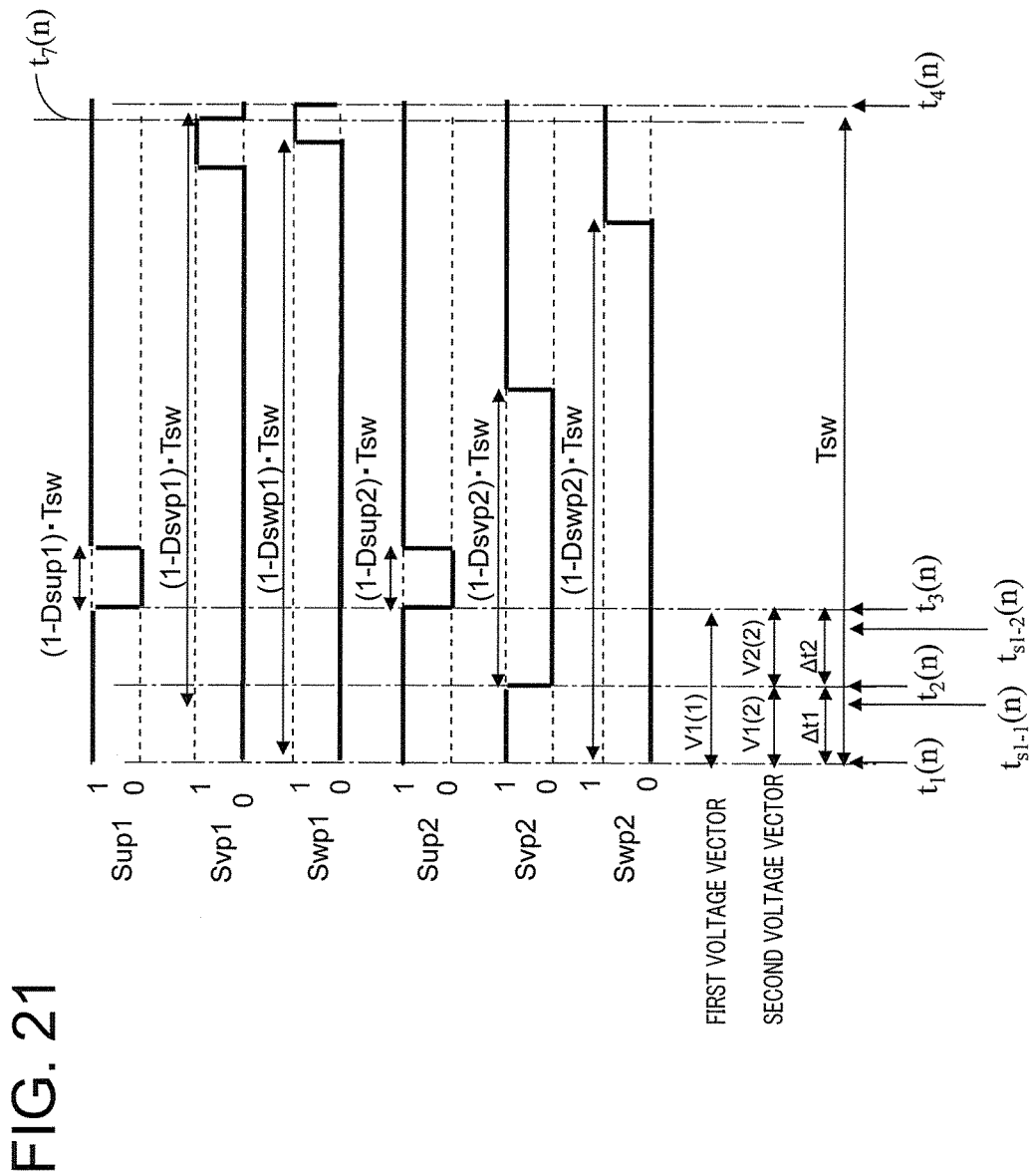
FIG. 21 is an operational diagram relating to the ON/OFF patterns of the semiconductor switches and the current detection timings of the current detectors according to the first embodiment of this invention.

FIG. 21 is an operational diagram relating to the ON/OFF patterns of the semiconductor switches and the current detection timings of the current detectors 4a, 4b according to the first embodiment of this invention. FIG. 21 shows an operation for solving the problem illustrated in FIG. 17. More specifically, in FIG. 21, the OFF timing of Svp1 is shifted to t7($n$) from FIG. 17.

t7($n$) is set to be within the "second predetermined value" of the timing t4($n$) at which the first minimum phase voltage is switched OFF. In so doing, the OFF time of the first intermediate phase voltage is set to be within the second predetermined value of the OFF time of the first minimum phase voltage. Hence, with the configuration shown in FIG. 21, the first voltage application device 3a does not perform switching in the vicinity of ts1-1($n$), and as a result, Idc2 can be detected at ts1-1($n$) with a higher degree of precision than in FIG. 17.

Figure 22:
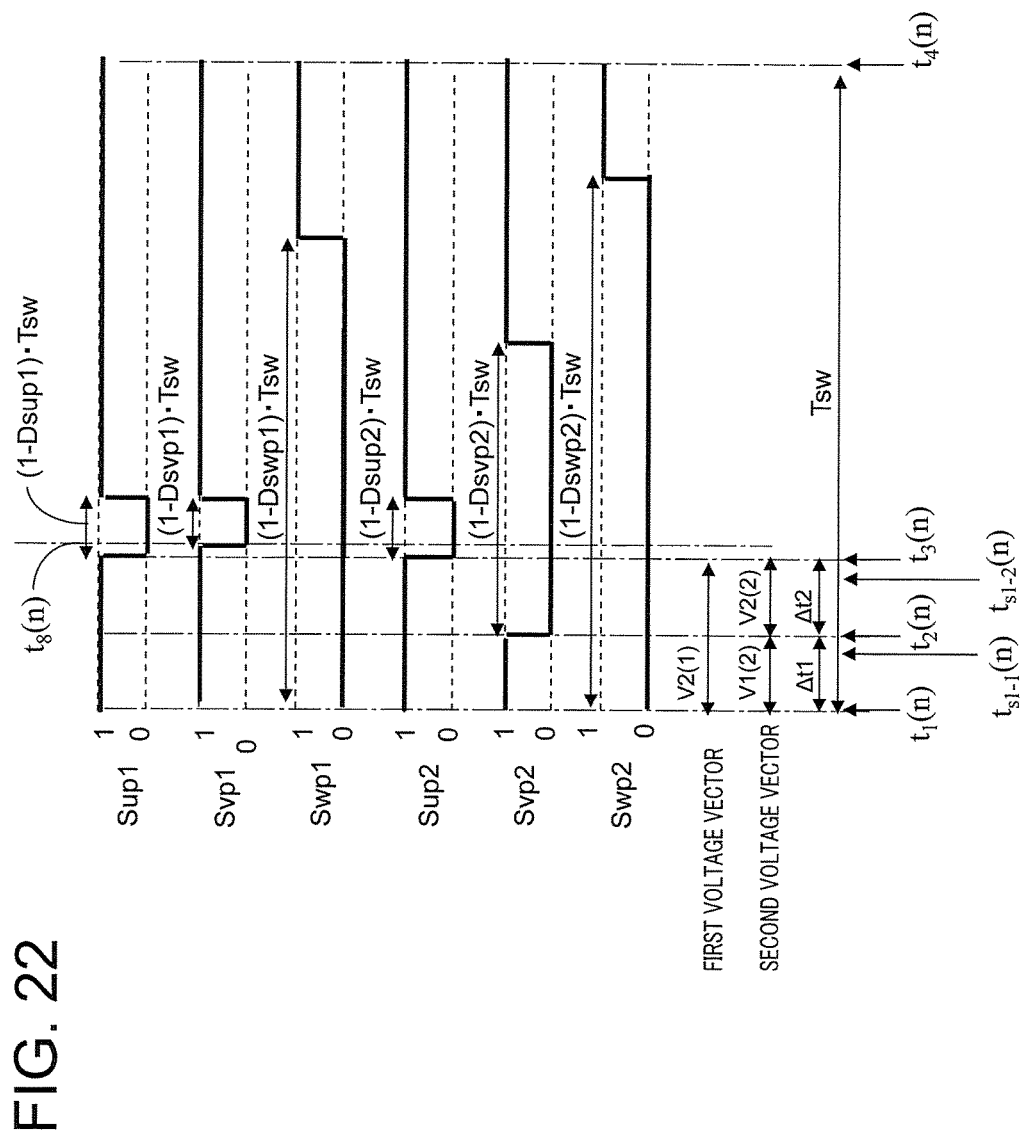
FIG. 22 is an operational diagram relating to the ON/OFF patterns of the semiconductor switches and the current detection timings of the current detectors according to the first embodiment of this invention.

FIG. 22 is an operational diagram relating to the ON/OFF patterns of the semiconductor switches and the current detection timings of the current detectors 4a, 4b according to the first embodiment of this invention. FIG. 22 shows an operation for solving the problem illustrated in FIG. 18. More specifically, in FIG. 22, the OFF timing of Svp1 is shifted to t8($n$) from FIG. 18.

t8($n$) is set to be within the "second predetermined value" of the timing t3($n$) at which the first maximum phase voltage is switched ON. In so doing, the OFF time of the first intermediate phase voltage is set to be within the second predetermined value of the OFF time of the first maximum phase voltage. Hence, with the configuration shown in FIG. 22, the first voltage application device 3a does not perform switching in the vicinity of ts1-2($n$), and as a result, Idc2 can be detected at ts1-2($n$) with a higher degree of precision than in FIG. 18.

FIGS. 14, 15, 21, and 22 illustrate methods with which Idc2 can be detected with a high degree of precision at ts1-1($n$) or ts1-2($n$) in a case where the first intermediate phase voltage Emid1 cannot be secured for the duration of the time shift Δt1 or Δt2. However, it goes without saying that by applying the switching patterns according to this invention, Idc1, rather than Idc2, can be detected with a high degree of precision at ts1-1($n$) or ts1-2($n$) in a case where the second intermediate phase voltage Emid2 cannot be secured for the duration of the time shift Δt1 or Δt2.

Next, the first detectability determination device 12a and the second detectability determination device 12b will be described. FIGS. 23A-23D are illustrative views relating to functions of the first detectability determination device 12a and the second detectability determination device 12b according to the first embodiment of this invention.

Specifically, the first detectability determination device 12a determines whether or not the first current detector 4a can detect the first three-phase currents by determining whether or not the voltage command value of the phase corresponding to the first intermediate phase voltage Emid1 is within a range extending from a third predetermined value Vs3 down to a fourth predetermined value Vs4. Similarly, the second detectability determination device 12b determines whether or not the second current detector 4b can detect the second three-phase currents by determining whether or not the voltage command value of the phase corresponding to the second intermediate phase voltage Emid2 is within a range extending from the third predetermined value Vs3 down to the fourth predetermined value Vs4.

Here, when the first intermediate phase voltage Emid1 or the second intermediate phase voltage Emid2 is equal to the third predetermined value Vs3, this means that the ON time of the intermediate phase voltage within Tsw of the upper side arm element is equal to Tsw−Δt1. Accordingly, the third predetermined value Vs3 corresponds to an upper limit value at which the time shift Δt1 can be secured.

Meanwhile, when the first intermediate phase voltage Emid1 or the second intermediate phase voltage Emid2 is equal to the fourth predetermined value Vs4, this means that Δt2 can be secured within the ON time of the intermediate phase voltage within Tsw of the upper side arm element. Accordingly, the fourth predetermined value Vs4 serves as a lower limit value at which the time shift Δt2 can be secured.

In FIG. 23A, a dotted line indicates the first voltage commands Vu1', Vv1', Vw1' shown in FIG. 7B, a solid line indicates the first intermediate phase voltage Emid1, and dot-dash lines indicate the third predetermined value Vs3 and the fourth predetermined value Vs4. Here, $$Vs1=0.4\ Vdc1$$

$$Vs2=-0.4\ Vdc1$$

FIG. 23B shows the output of the first detectability determination device 12a. The first detectability determination device 12a determines whether or not the first three-phase currents can be detected by determining whether or not the first intermediate phase voltage Emid1 is within the range extending from the third predetermined value Vs3 down to the fourth predetermined value Vs4. The first detectability determination device 12a outputs the first detectability determination signal flag_1 at 1 when the first intermediate phase voltage Emid1 is within the range extending from the third predetermined value Vs3 down to the fourth predetermined value Vs4, and at 0 when the first intermediate phase voltage Emid1 is outside this range.

In FIG. 23C, a dotted line indicates the second voltage commands Vu2', Vv2', Vw2' shown in FIG. 8B, a solid line indicates the second intermediate phase voltage Emid2, and dot-dash lines indicate the third predetermined value Vs3 and the fourth predetermined value Vs4.

FIG. 23D shows the output of the second detectability determination device 12b. The second detectability determination device 12b determines whether or not the second three-phase currents can be detected by determining whether or not the second intermediate phase voltage Emid2 is within the range extending from the third predetermined value Vs3 down to the fourth predetermined value Vs4, and outputs the second detectability determination signal flag_2 at 1 when the second intermediate phase voltage Emid2 is within the range extending from the third predetermined value Vs3 down to the fourth predetermined value Vs4, and at 0 when the second intermediate phase voltage Emid2 is outside this range.

Focusing on the first detectability determination signal flag_1, the first detectability determination signal flag_1 shifts to 0 in the vicinity of a voltage phase angle θv of 60×x (where x is 0, 1, 2, 3, 4, 5, 6). Focusing on the second detectability determination signal flag_2, the second detectability determination signal flag_2 shifts to 0 in the vicinity of a voltage phase angle θv of 30+60×x (where x is 0, 1, 2, 3, 4, 5).

Hence, the voltage phase angles θv at which the first detectability determination signal flag_1 and the second detectability determination signal flag_2 shift to 0 deviate from each other by 30 degrees, and therefore, when flag_1 is at 0, flag_2 is at 1, and conversely when flag_2 is at 0, flag_1 is at 1. It is therefore evident that flag_1 and flag_2 are never at 0 simultaneously, and at least one thereof is at 1.

FIG. 24 is a flowchart showing a series of operations executed by the first detectability determination device 12a according to the first embodiment of this invention. In step S1000a, the first detectability determination device 12a calculates the first intermediate phase voltage Emid1 on the basis of the first voltage commands Vu1', Vv1', Vw1'.

In step S1000b, the first detectability determination device 12a determines whether or not the first intermediate phase voltage Emid1 is equal to or smaller than the third predetermined value Vs3. When "YES" is obtained, the routine advances to step S1000c, and when "NO" is obtained, the routine advances to step S1000e.

When the routine advances to step S1000c, the first detectability determination device 12a determines whether or not the first intermediate phase voltage Emid1 equals or exceeds the fourth predetermined value Vs4. When "YES" is obtained, the routine advances to step S1000d, and when "NO" is obtained, the routine advances to step S1000e.

When the routine advances to step S1000d, the first detectability determination device 12a inserts 1 into the first detectability determination signal flag_1. When the routine advances to step S1000e, on the other hand, the first detectability determination device 12a inserts 0 into the first detectability determination signal flag_1.

FIG. 25 is a flowchart showing a series of operations executed by the second detectability determination device 12b according to the first embodiment of this invention. In step S2000a, the second detectability determination device 12b calculates the second intermediate phase voltage Emid2 on the basis of the second voltage commands Vu2', Vv2', Vw2'.

In step S2000b, the second detectability determination device 12b determines whether or not the second intermediate phase voltage Emid2 is equal to or smaller than the third predetermined value Vs3. When "YES" is obtained, the routine advances to step S2000c, and when "NO" is obtained, the routine advances to step S2000e.

In step S2000c, the second detectability determination device 12b determines whether or not the second intermediate phase voltage Emid2 equals or exceeds the fourth predetermined value Vs4. When "YES" is obtained, the routine advances to step S2000d, and when "NO" is obtained, the routine advances to step S2000e.

When the routine advances to step S2000d, the second detectability determination device 12b inserts 1 into the second detectability determination signal flag_2. When the routine advances to step S2000e, on the other hand, the second detectability determination device 12b inserts 0 into the second detectability determination signal flag_2.

Figure 26:
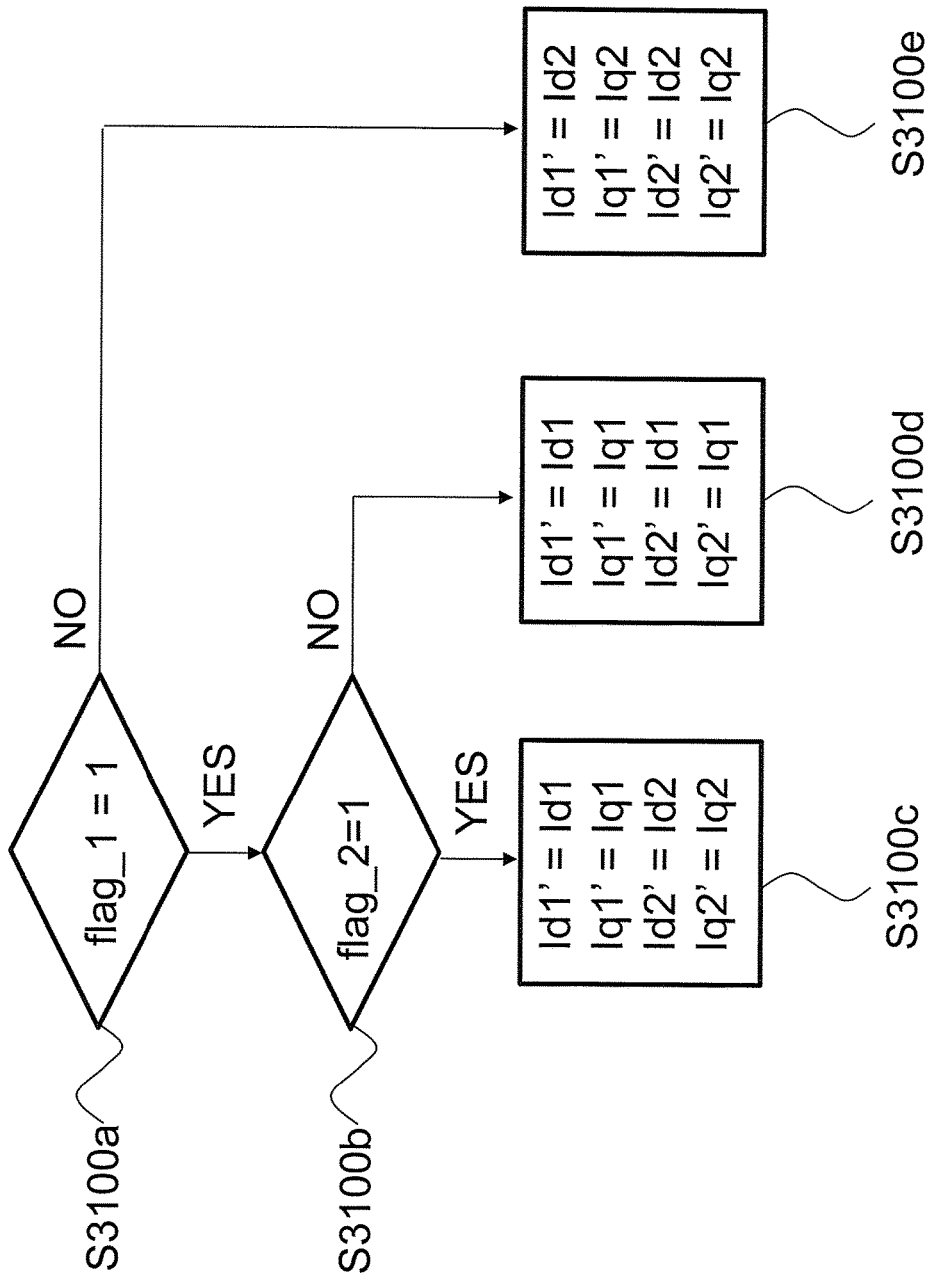
FIG. 26 is a flowchart showing a series of operations executed by a switch according to the first embodiment of this invention.

Next, operations of the switch 7a will be described using FIG. 26. FIG. 26 is a flowchart showing a series of operations executed by the switch 7a according to the first embodiment of this invention. The switch operation implemented by the switch 7a branches to steps S3100c, S3100d, and S3100e depending on a determination result obtained in step S3100a as to whether or not the first detectability determination signal flag_1 is equal to 1 and a determination result obtained in step S3100b as to whether or not the second detectability determination signal flag_2 is equal to 1.

When flag_1 is equal to 1 and flag_2 is equal to 1, the routine advances to step S3100c, where the currents Id1, Iq1 of the first windings and the currents Id2, Iq2 of the second windings are selected as Id1', Iq1' and Id2', Iq2', respectively, and output.

When flag_1 is equal to 1 and flag_2 is not equal to 1, the routine advances to step S3100d, where the currents Id1, Iq1 of the first windings are selected as both Id1', Iq1' and Id2', Iq2' and output.

When flag_1 is not equal to 1, the routine advances to step S3100e regardless of the value of flag_2, where the currents Id2, Iq2 of the second windings are selected as both Id1', Iq1' and Id2', Iq2' and output.

Note that in the first embodiment, an example in which the first voltage application device 3a applies voltages to the first three-phase windings at ON intervals (Δt1, Δt2) equaling or exceeding the first predetermined value was described. However, it goes without saying that this invention may also be employed in a case in which voltages are applied at OFF intervals equaling or exceeding the first predetermined value.

Further, in the first embodiment, as shown in FIG. 15, an example in which the first intermediate phase voltage is modified so as to be switched ON at a timing within the second predetermined value of the first maximum phase voltage when the first intermediate phase voltage is larger than the first predetermined value was described. However, the first minimum phase voltage may be modified in addition to the first intermediate phase voltage so as to be switched ON at a timing within the second predetermined value of the first maximum phase voltage.

In this case, the voltages of all three phases, among the voltages applied to the first three-phase windings, are switched ON within the second predetermined value. According to this invention, therefore, the ON or OFF interval can be set within the second predetermined value with respect to at least two phases in a case where the currents of the first three-phase windings or the currents of the second three-phase windings are determined to be undetectable.

According to the first embodiment, as described above, switching by the voltage application device at the current detection timing can be avoided without lengthening the switching period Tsw, as in PTL 1, and without the need to limit the amplitudes of the first voltage commands to a range in which the first intermediate phase voltage can be secured over the duration of the time shifts. As a result, the output of the AC rotary machine 1a can be increased while keeping the noise generated thereby low.

Second Embodiment

In a control device for an AC rotary machine according to a second embodiment, calculation processing implemented by a first detectability determination device 12c differs from that of the first detectability determination device 12a according to the first embodiment. Accordingly, the following description focuses on the calculation processing executed by the first detectability determination device 12c according to the second embodiment.

Figure 27:
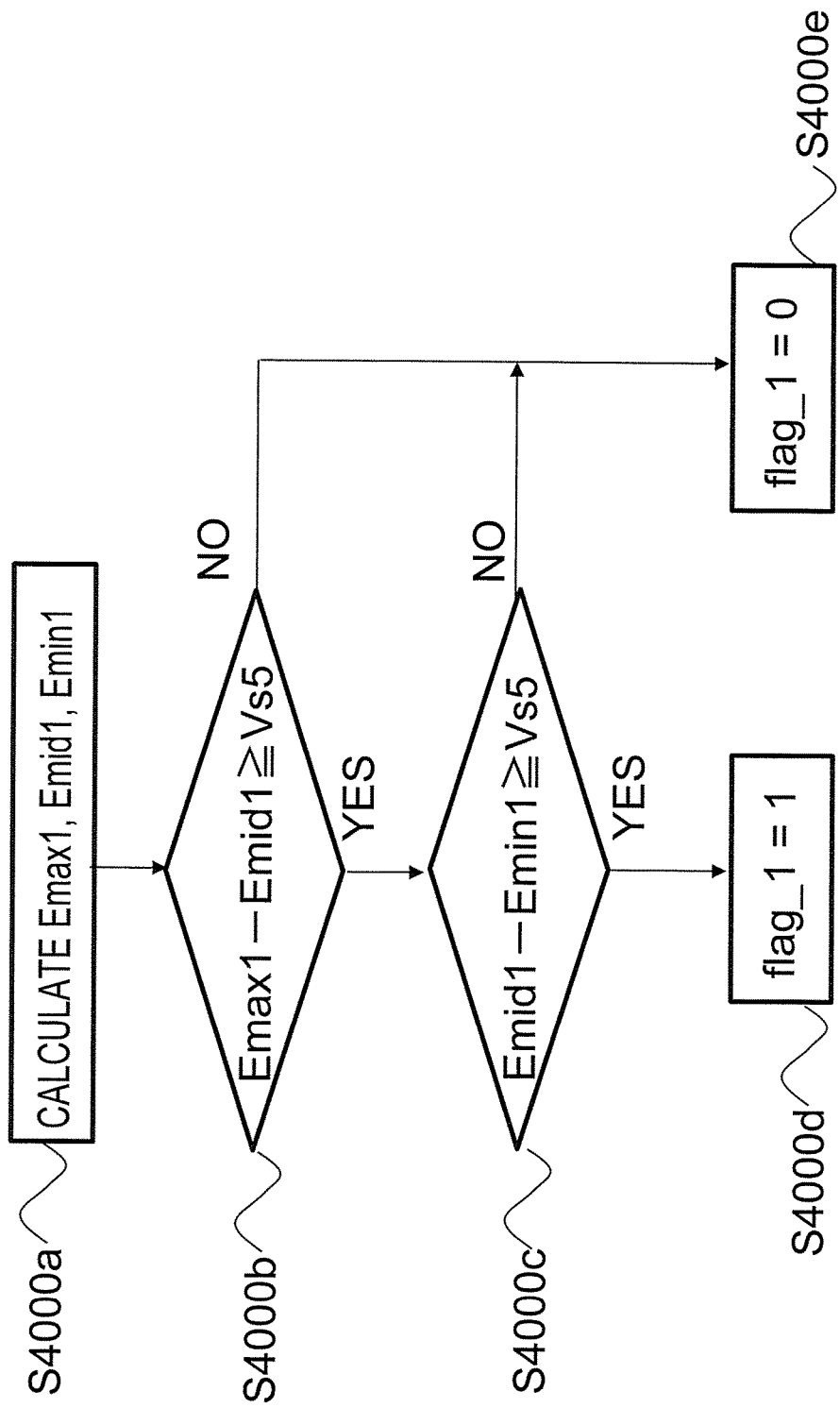
FIG. 27 is a flowchart showing a series of operations executed by a first detectability determination device according to a second embodiment of this invention.

FIG. 27 is a flowchart showing a series of operations executed by the first detectability determination device 12c according to the second embodiment of this invention. In step S4000a, the first detectability determination device 12c calculates the first maximum phase voltage Emax1, the first intermediate phase voltage Emid1, and the first minimum phase voltage Emin1 on the basis of the first voltage commands Vu1', Vv1', Vw1'.

In step S4000b, the first detectability determination device 12c determines whether or not a difference (Emax1−Emid1) between the first maximum phase voltage and the first intermediate phase voltage equals or exceeds a fifth predetermined value Vs5. When "YES" is obtained, the routine advances to step S4000c, and when "NO" is obtained, the routine advances to step S4000e.

When the routine advances to step S4000c, the first detectability determination device 12c determines whether or not a difference (Emid1−Emin1) between the first intermediate phase voltage and the first minimum phase voltage equals or exceeds the fifth predetermined value Vs5. When "YES" is obtained, the routine advances to step S4000d, and when "NO" is obtained, the routine advances to step S4000e.

When the routine advances to step S4000d, the first detectability determination device 12c inserts 1 into the first detectability determination signal flag_1. When the routine advances to step S4000e, on the other hand, the first detectability determination device 12c inserts 0 into the first detectability determination signal flag_1.

Here, the fifth predetermined value Vs5 may be determined on the basis of a ratio of the time shift $\Delta t1$ or the time shift $\Delta t2$ and the switching period Tsw (50 µs). For example, when the time shift $\Delta t1 = \Delta t2 = 5$ µs and the switching period is set as Tsw, the fifth predetermined value Vs5 is $\Delta t1/Tsw \times Vdc = 0.1$ Vdc.

Figures 28A, 28B, 28C, 28D:
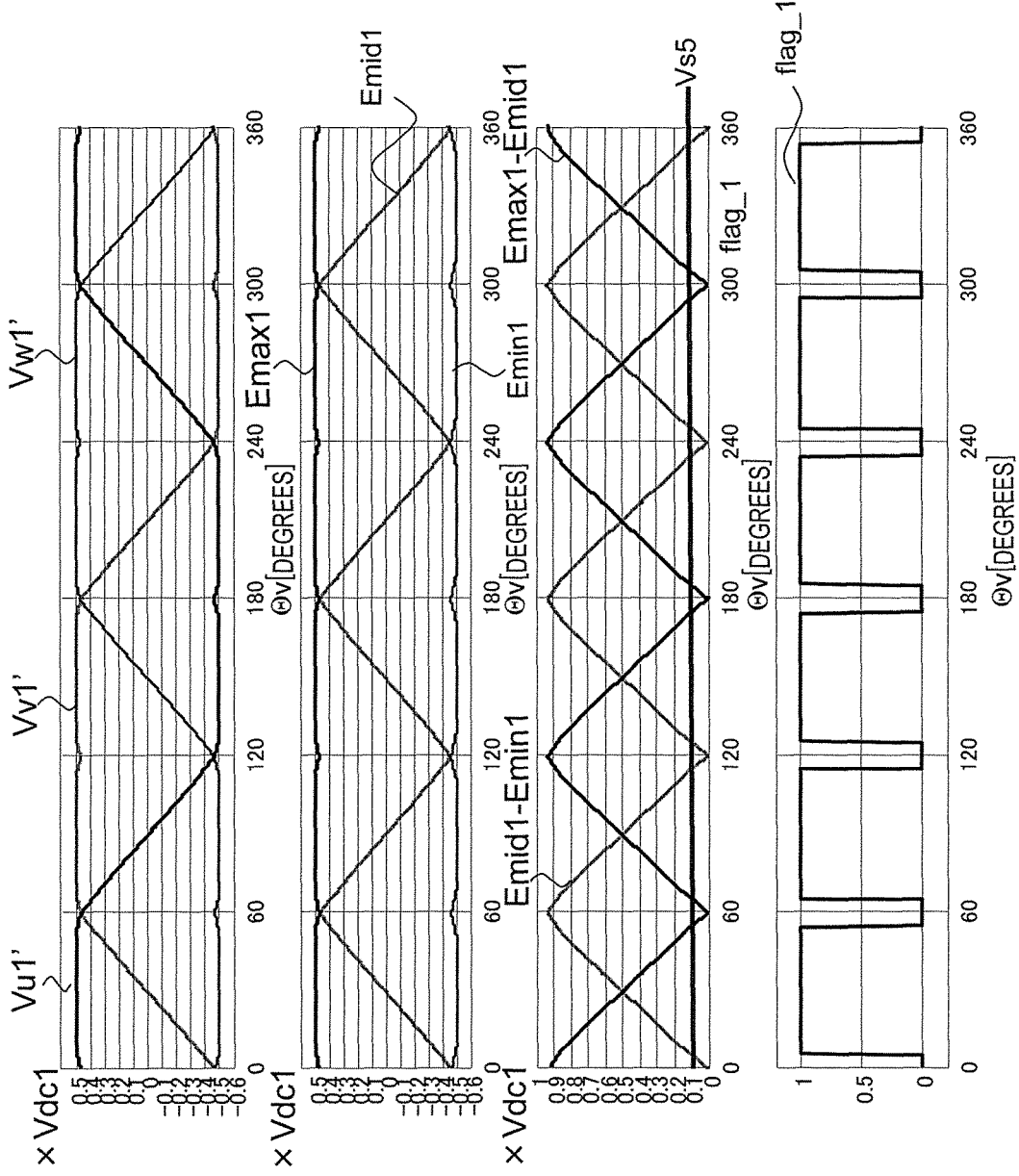
FIGS. 28A-28D are views showing waveforms corresponding to respective steps of FIG. 27 in a case where a fifth predetermined value Vs5 is set at 0.1 Vdc, according to the second embodiment of this invention.

FIGS. 28A-28D are views showing waveforms corresponding to the respective steps of FIG. 27 in a case where the fifth predetermined value Vs5 is set at 0.1 Vdc, according to the second embodiment of this invention. FIG. 28A shows waveforms of the first voltage commands Vu1', Vv1', Vw1', and FIG. 28B shows respective waveforms of the first maximum phase voltage Emax1, the first intermediate phase voltage Emid1, and the first minimum phase voltage Emin1, corresponding to step S4000a.

FIG. 28C shows respective waveforms of the difference Emax1−Emid1 between the first maximum phase voltage and the first intermediate phase voltage, corresponding to step S4000b, and the difference Emid1−Emin1 between the first intermediate phase voltage and the first minimum phase voltage, corresponding to step S4000c. Further, FIG. 28D shows a waveform of the first detectability determination signal flag_1, corresponding to steps S4000d and S4000e.

As illustrated in the second embodiment, the respective differences between the first maximum phase voltage and the first intermediate phase voltage and between the first intermediate phase voltage and the first minimum phase voltage are calculated, and when the values thereof are smaller than the fifth predetermined value, the first three-phase currents are determined to be undetectable. As a result, identical effects to those of the first embodiment can be obtained.

Furthermore, in the second embodiment, the first detectability determination device 12c determines whether or not the first three-phase currents are detectable on the basis of the first voltage commands Vu1', Vv1', Vw1' serving as the output of the offset calculator 11a. However, identical calculation results are obtained for Emax1−Emid1 and Emid1−Emin1 when Emax1−Emid1 and Emid1−Emin1 are calculated on the basis of the first voltage commands Vu1, Vv1, Vw1 serving as the input of the offset calculator 11a instead of the first voltage commands Vu1', Vv1', Vw1'.

Hence, identical effects to those obtained when Emax1−Emid1 and Emid1−Emin1 are calculated on the basis of the first voltage commands Vu1', Vv1', Vw1' are obtained with a configuration in which the first voltage commands Vu1, Vv1, Vw1 are input into the first detectability determination device 12c.

Note that in the second embodiment, the calculations implemented by the first detectability determination device 12c were described. As regards the second detectability determination device 12b, it goes without saying that the second detectability determination signal flag_2 can be obtained by implementing the calculations shown in FIG. 27 in a similar manner to the first detectability determination device 12c using the second voltage commands Vu2', Vv2', Vw2'.

Third Embodiment

In a control device for an AC rotary machine according to a third embodiment, calculation processing implemented by a first detectability determination device 12d differs from that of the first detectability determination device 12a according to the first embodiment. Accordingly, the following description focuses on the calculation processing executed by the first detectability determination device 12d according to the third embodiment.

The first detectability determination device 12d according to the third embodiment calculates the voltage phase angle θv on the basis of the first voltage commands Vu1', Vv1', Vw1' using Equation (21), shown below, and determines whether or not the first three-phase currents are detectable in accordance with a region of the voltage phase angle θv.

[Math. 1]

$$\theta_v = \arctan\left(\frac{\frac{\sqrt{3}}{2}(V'_{v1} - V'_{w1})}{V'_{u1} - 0.5V'_{v1} - 0.5V'_{w1}}\right) \quad (21)$$

In the first embodiment, described above, the first three-phase currents are determined to be undetectable when the voltage phase angle θv is in the vicinity of 60×x (where x is 0, 1, 2, 3, 4, 5, 6). Hence, when θv calculated on the basis of the first voltage commands is within a range of no less than 60×x−α and no more than 60×x+α (where α is a margin), the first detectability determination device 12d determines that the first three-phase currents are undetectable and outputs 0 as flag_1. When θv is outside this range, on the other hand, the first detectability determination device 12d determines that the first three-phase currents are detectable and outputs 1 as flag_1.

Here, the margin α is determined from the time shifts Δt1 and Δt2, a maximum value of the first voltage command, and so on, but the magnitude thereof does not exceed 30 degrees.

As illustrated in the third embodiment, identical effects to the first embodiment can be obtained by determining the detectability of the first three-phase currents in accordance with the voltage phase angle of the first voltage commands.

Note that in the first embodiment, the second three-phase currents are determined to be undetectable when the voltage phase angle θv is in the vicinity of 30+60×x (where x is 0, 1, 2, 3, 4, 5). Hence, when θv calculated on the basis of the first voltage commands is within a range of no less than 30+60×x−α and no more than 30+60×x+α (where α is a margin), the second detectability determination device 12b determines that the second three-phase currents are undetectable and outputs 0 as flag_2. When θv is outside this range, on the other hand, the second detectability determination device 12b determines that the second three-phase currents are detectable and outputs 1 as flag_2.

Further, in the third embodiment, the first detectability determination device 12d determines whether or not the first three-phase currents are detectable on the basis of the first voltage commands Vu1', Vv1', Vw1' serving as the output of the offset calculator 11a. However, an identical result to the calculation result obtained from Equation (21) is obtained when the detectability of the first three-phase currents is calculated on the basis of the first voltage commands Vu1, Vv1, Vw1 serving as the input of the offset calculator 11a instead of the first voltage commands Vu1', Vv1', Vw1'.

Hence, identical effects to those obtained when the detectability of the first three-phase currents is calculated on the basis of the first voltage commands Vu1', Vv1', Vw1' are obtained with a configuration in which the first voltage commands Vu1, Vv1, Vw1 are input into the first detectability determination device 12d.

All other methods of determining the voltage phase angle θv on the basis of the voltage commands and then determining the detectability of the first three-phase currents or the detectability of the second three-phase currents on the basis of the voltage phase angle θv, such as a method of determining the voltage phase angle θv on the basis of the voltage commands Vd1, Vq1 on two rotational axes, are included in this invention.

Further, the first detectability determination device 12d may determine the voltage phase angle θv on the basis of the second voltage commands Vu2', Vv2', Vw2' instead of the first voltage commands Vu1, Vv1, Vw1 using Equation (22), shown below.

[Math. 2]

$$\theta_v = \arctan\left(\frac{\frac{\sqrt{3}}{2}(V'_{v2} - V'_{w2})}{V'_{u2} - 0.5V'_{v2} - 0.5V'_{w2}}\right) + 30 \quad (22)$$

Needless to mention, the voltage phase angle θv may also be calculated using the second voltage commands Vu2, Vv2, Vw2 and the voltage commands Vd2, Vq2 on two rotational axes.

Furthermore, by calculating both Equation (21) and Equation (22) and using an average value thereof to determine the detectability of the first three-phase currents or the detectability of the second three-phase currents, an effect of suppressing a noise component included in the voltage phase angle θv can be obtained.

Fourth Embodiment

Figure 29:
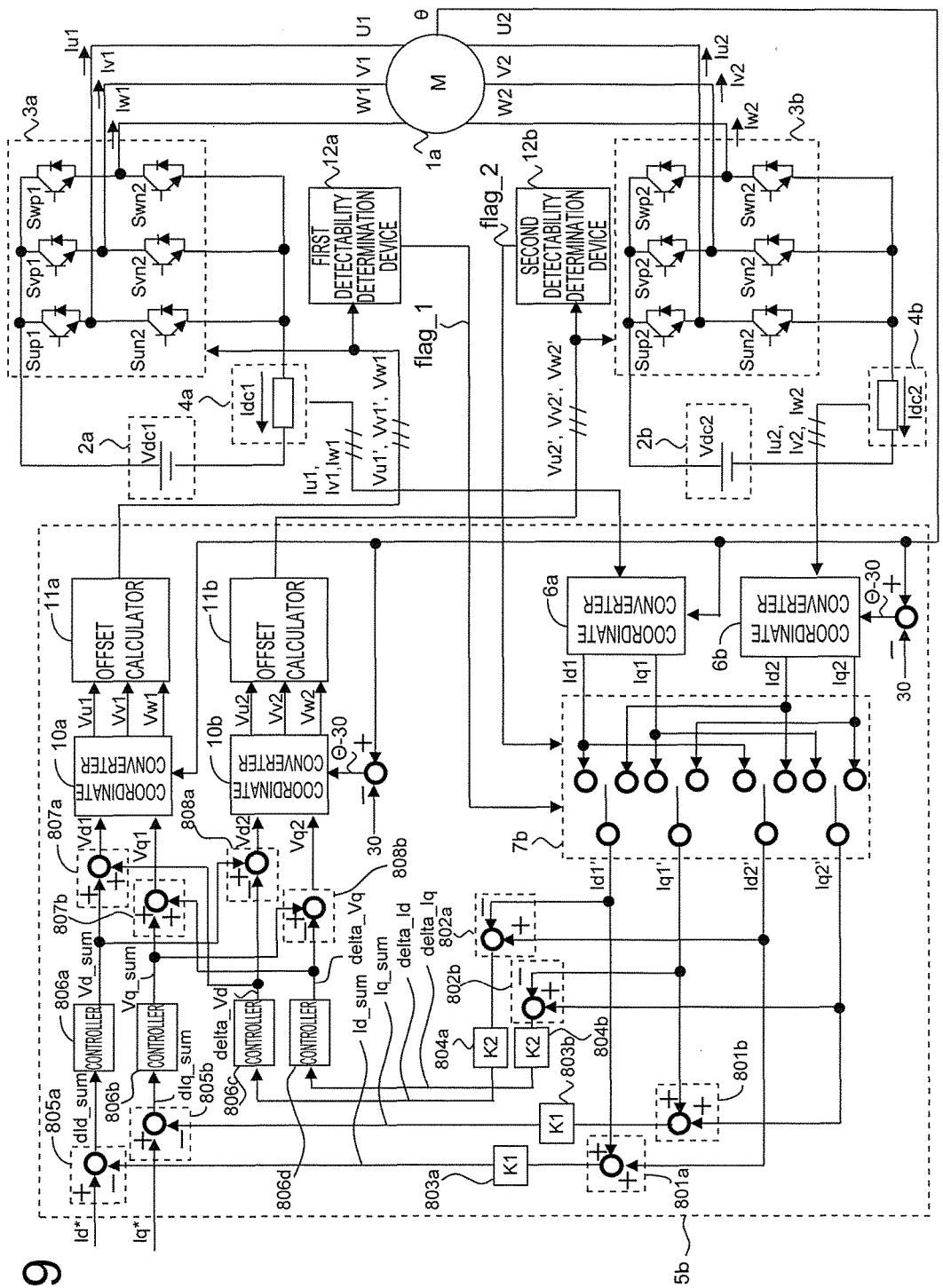
FIG. 29 is a view showing an overall configuration of a control device for an AC rotary machine according to a fourth embodiment of this invention.

FIG. 29 is a view showing an overall configuration of a control device for an AC rotary machine according to a fourth embodiment of this invention. The fourth embodiment differs from the first embodiment in that a control unit 5b is used instead of the control unit 5a. Accordingly, the following description focuses on modifications applied to the control unit 5a to obtain the control unit 5b.

An adder 801a outputs an added value (Id1'+Id2') obtained by adding together the current Id1' on two rotational axes and the current Id2' on two rotational axes.

An adder 801b outputs an added value (Iq1'+Iq2') obtained by adding together the current Iq1' on two rotational axes and the current Iq2' on two rotational axes.

A subtractor 802a outputs a value (Id1'−Id2') obtained by subtracting the current Id2' on two rotational axes from the current Id1' on two rotational axes.

A subtractor 802b outputs a value (Iq1'−Iq2') obtained by subtracting the current Iq2' on two rotational axes from the current Iq1' on two rotational axes.

A multiplier 803a multiplies the added value (Id1'+Id2') output by the adder 801a by K1, and outputs the result as a sum current Id_sum. Here, K1=0.5.

A multiplier 803b multiplies the added value (Iq1'+Iq2') output by the adder 801b by K1, and outputs the result as a sum current Iq_sum. Here, K1=0.5.

A multiplier 804a multiplies the subtracted value (Id1'−Id2') output by the subtractor 802a by K2, and outputs the result as a differential current delta_Id. Here, K2=0.5.

A multiplier 804b multiplies the subtracted value (Iq1'−Iq2') output by the subtractor 802b by K2, and outputs the result as a differential current delta_Iq. Here, K2=0.5.

A subtractor 805a calculates a deviation dId_sum between the d axis current command Id* of the AC rotary machine 1a and the sum current Id_sum.

A subtractor 805b calculates a deviation dIq_sum between the q axis current command Iq* of the AC rotary machine 1a and the sum current Iq_sum.

A controller 806a outputs a sum voltage Vd_sum at which the deviation dId_sum is controlled to zero using a P controller, a PI controller, and the like on the basis of a product of a proportional gain Kpd_sum of the used controllers and the deviation dId_sum.

A controller 806b outputs a sum voltage Vd_sum at which the deviation dIq_sum is controlled to zero using a P controller, a PI controller, and the like on the basis of a product of a proportional gain Kpq_sum of the used controllers and the deviation dIq_sum.

A controller 806c outputs a differential voltage delta_Vd at which the differential current delta_Id is controlled to zero using a P controller, a PI controller, and the like on the basis of a product of a proportional gain Kpd_delta of the used controllers and a deviation delta_dId.

A controller 806d outputs a differential voltage delta_Vq at which the differential current delta_Iq is controlled to zero using a P controller, a PI controller, and the like on the basis of a product of a proportional gain Kpq_delta of the used controllers and a deviation delta_Vq.

An adder 807a outputs a value obtained by adding together the sum voltage Vd_sum and the differential voltage delta_Vd as the first voltage command Vd1.

An adder 807b outputs a value obtained by adding together the sum voltage Vq_sum and the differential voltage delta_Vq as the first voltage command Vq1.

A subtractor 808a outputs a value obtained by subtracting the differential voltage delta_Vd from the sum voltage Vd_sum as the second voltage command Vd2.

A subtractor 808b outputs a value obtained by subtracting the differential voltage delta_Vq from the sum voltage Vq_sum as the second voltage command Vq2.

Next, the operations performed by the control unit 5b according to the fourth embodiment will be described in detail.

When the first detectability determination signal flag_1 and the second detectability determination signal flag_2 are both at 1 (in other words, when the first three-phase currents and the second three-phase currents are both determined to be detectable), the currents Id1', Iq1' on two rotational axes are equal to the currents Id1, Iq1 of the first windings and the currents Id2', Iq2' on two rotational axes are equal to the currents Id2, Iq2 of the second windings.

Hence, the sum currents Id_sum, Iq_sum and the differential currents delta_Id, delta_Iq are as shown below in Equations (23) to (26), respectively.

$$\text{Id\_sum} = K1 \times (Id1' + Id2') \quad (23)$$
$$= K1 \times (Id1 + Id2)$$

$$\text{Iq\_sum} = K1 \times (Iq1' + Iq2') \quad (24)$$
$$= K1 \times (Iq1 + Iq2)$$

$$\text{delta\_Id} = K2 \times (Id1' - Id2') \quad (25)$$
$$= K2 \times (Id1 - Id2)$$

$$\text{delta\_Iq} = K2 \times (Iq1' - Iq2') \quad (26)$$
$$= K2 \times (Iq1 - Iq2)$$

In other words, the sum currents are expressed by the sum of the first three-phase currents detected by the first current detector 4a and the second three-phase currents detected by the second current detector 4b, while the differential currents are expressed by the difference between the first three-phase currents detected by the first current detector 4a and the second three-phase currents detected by the second current detector 4b.

The sum voltages Vd_sum, Vq_sum are calculated on the basis of the sum currents Id_sum, Iq_sum and a sum current gain, while the differential voltages delta_Vd, delta_Vq are calculated on the basis of the differential currents delta_Id, delta_Iq and a differential current gain. Further, the first current commands Vd1, Vq1 and the second current commands Vq2, Vq2 are calculated by the adders 807a, 807b and the subtractors 808a, 808b.

Here, the first three-phase windings U1, V1, W1 and the second three-phase windings U2, V2, W2 of the AC rotary machine 1a are magnetically coupled but not electrically connected. Therefore, voltages that are proportionate to products of respective differential values of the first three-phase currents and a mutual inductance between the first windings and the second windings are generated in the second three-phase windings. Meanwhile, voltages that are proportionate to products of respective differential values of the second three-phase currents and the mutual inductance between the first windings and the second windings are generated in the first three-phase windings. In other words, the first windings and the second windings interfere with each other magnetically.

In the fourth embodiment, however, the first voltage commands Vd1, Vq1 and the second voltage commands Vd2, Vq2 are calculated on the basis of the sum currents and the differential currents. As a result, when the first three-phase currents and the second three-phase currents are both detectable, the voltage commands Vd1, Vq1 of the first windings are calculated in consideration of not only the first three-phase currents detected by the first current detector 4a, but also the second three-phase currents detected by the second current detector 4b.

Similarly, the second voltage commands Vd2, Vq2 are calculated in consideration of not only the second three-phase currents detected by the second current detector 4b, but also the first three-phase currents detected by the first current detector 4a. Therefore, by providing the configuration of the fourth embodiment, a more stable control system can be constructed with respect to magnetic interference between the first windings and the second windings.

Next, when the first detectability determination signal flag_1 is at 0 and the second detectability determination signal flag_2 is at 1 (in other words, when the first three-phase currents are determined to be undetectable but the second three-phase currents are determined to be detectable), the currents Id1', Iq1' on two rotational axes are equal to the currents Id2, Iq2 of the second windings and the currents Id2', Iq2' on two rotational axes are also equal to the currents Id2, Iq2 of the second windings, as shown in FIG. 26.

Hence, the sum currents Id_sum, Iq_sum and the differential currents delta_Id, delta_Iq are as shown below in Equations (27) to (30), respectively.

$$\text{Id\_sum} = K1 \times (Id1' + Id2') \quad (27)$$
$$= K1 \times (2 \times Id2)$$

$$\text{Iq\_sum} = K1 \times (Iq1' + Iq2') \quad (28)$$
$$= K1 \times (2 \times Iq2)$$

$$\text{delta\_Id} = K2 \times (Id1' - Id2') = 0 \quad (29)$$

$$\text{delta\_Iq} = K2 \times (Iq1' - Iq2') = 0 \quad (30)$$

As shown in Equations (27) to (30), the sum currents are expressed by the second three-phase currents detected by the second current detector 4b, while the differential currents are 0. Accordingly, the first voltage commands Vd1, Vq1 and the second voltage commands Vd2, Vq2 are calculated on the basis of the second three-phase currents and the sum current gain.

Next, when the first detectability determination signal flag_1 is at 1 and the second detectability determination signal flag_2 is at 0 (in other words, when the first three-phase currents are determined to be detectable but the second three-phase currents are determined to be undetectable), the currents Id1', Iq1' on two rotational axes are equal to the currents Id1, Iq1 of the first windings and the currents Id2', Iq2' on two rotational axes are also equal to the currents Id1, Iq1 of the first windings, as shown in FIG. 26.

Hence, the sum currents Id_sum, Iq_sum and the differential currents delta_Id, delta_Iq are as shown below in Equations (31) to (34), respectively.

$$\text{Id\_sum} = K1 \times (Id1' + Id2') \quad (31)$$
$$= K1 \times (2 \times Id1)$$

$$\text{Iq\_sum} = K1 \times (Iq1' + Iq2') \quad (32)$$
$$= K1 \times (2 \times Iq1)$$

$$\text{delta\_Id} = K2 \times (Id1' - Id2') = 0 \quad (33)$$

$$\text{delta\_Iq} = K2 \times (Iq1' - Iq2') = 0 \quad (34)$$

As shown in Equations (31) to (34), the sum currents are expressed by the first three-phase currents detected by the first current detector 4a, while the differential currents are 0. Accordingly, the first voltage commands Vd1, Vq1 and the second voltage commands Vd2, Vq2 are calculated on the basis of the first three-phase currents and the sum current gain.

Here, the differential currents are set at 0 in accordance with Equations (29) and (30) when the first detectability determination device 12a outputs 0 as flag_1, and in accordance with Equations (33) and (34) when the second detectability determination device 12b outputs 0 as flag_2. Accordingly, the differential voltages obtained by multiplying the differential voltage gain by the differential currents also equal zero.

Therefore, the differential voltages delta_Vd, delta_Vq may be set at 0, and the subtractors 802a, 802b, the multipliers 804a, 804b, and the controllers 806c, 806d that calculate the differential voltages from the differential currents may be omitted.

Moreover, here, the three-phase currents of the windings on the detectable side are used as is as the three-phase currents on the undetectable side, but the three-phase currents on the undetectable side may be determined using another estimation method.

Further, by varying the differential current gains Kpd_delta, Kpq_delta on the basis of at least one of the first voltage commands, the second voltage commands, the sum voltages, and a rotation speed of the AC rotary machine 1a, pulsation in the differential voltages delta_Vd, delta_Vq caused by pulsation in the differential currents delta_Id, delta_Iq during switches in the first detectability determination signal flag_1 and the second detectability determination signal flag_2 from 0 to 1 or from 1 to 0 can be reduced.

Figure 30:
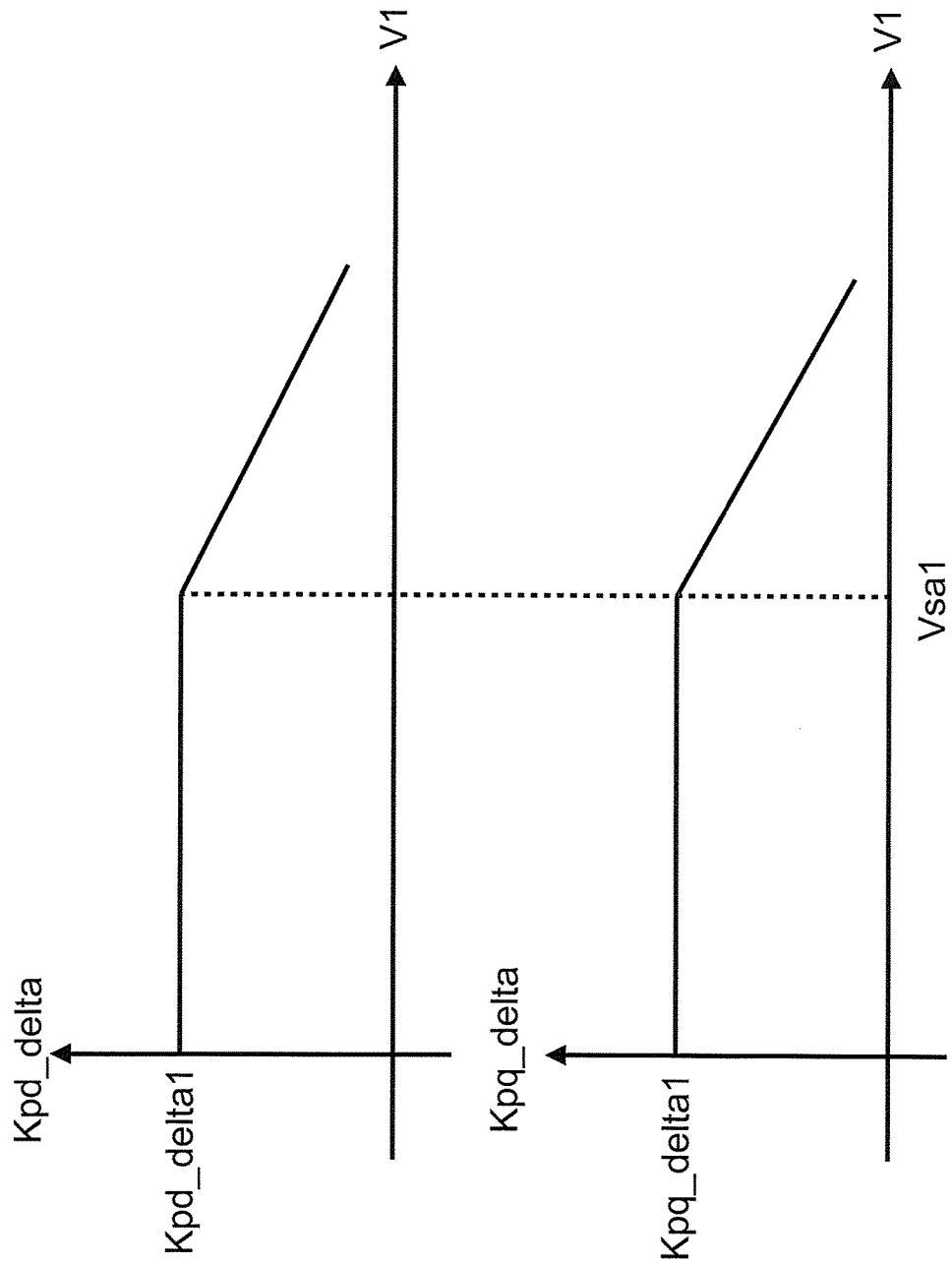
FIG. 30 is a view showing a condition in which a differential current gain is varied on the basis of a first voltage command, according to the fourth embodiment of this invention.

FIG. 30 is a view showing a condition in which the differential current gains are varied on the basis of the first voltage commands, according to the fourth embodiment of this invention. FIG. 30 shows a case in which the differential current gains Kpd_delta, Kpq_delta are varied in accordance with an amplitude V1 of the first voltage commands. When the amplitude V1 of the first voltage commands is no higher than a threshold Vsa1, the differential current gains Kpd_delta, Kpq_delta are set respectively at fixed values Kpd_delta1, Kpq_delta1.

When the amplitude V1 of the first voltage commands exceeds the threshold Vsa1, on the other hand, the differential current gains Kpd_delta, Kpq_delta are reduced along a straight line. The threshold Vsa1 and an incline of the straight line may be determined in accordance with a generated pulsation level. Here, the amplitude V1 of the first voltage commands may be determined using Equation (35), shown below.

[Math. 3]

$$V1 = \sqrt{2(V_{u1}^2 + V_{v1}^2 + V_{w1}^2)} = \sqrt{2(V_{d1}^2 + V_{q1}^2)} \quad (35)$$

Further, when a calculation load of a CPU that performs calculations as the control unit 5b increases due to calculating the square root in Equation (35), the abscissa of FIG. 30 may be set as the square of the amplitude. Furthermore, an amplitude V2 of the second voltage commands, which is given below in Equation (36), an amplitude V_sum of the sum voltages, which is given below in Equation (37), or a combination of V1, V2, and V_sum may be used as the abscissa of FIG. 30.

[Math. 4]

$$V2 = \sqrt{2(V_{u2}^2 + V_{v2}^2 + V_{w2}^2)} = \sqrt{2(V_{d2}^2 + V_{q2}^2)} \quad (36)$$

$$V\_\text{sum} = \sqrt{2(V_{d\text{sum}}^2 + V_{q\text{sum}}^2)} \quad (37)$$

By varying the sum current gains Kpd_sum, Kpq_sum on the basis of at least one of the first voltage commands, the second voltage commands, and the sum voltages, pulsation in the sum voltages Vd_sum, Vq_sum caused by pulsation in the sum currents Id_sum, delta_sum during switches in the first detectability determination signal flag_1 and the second detectability determination signal flag_2 can be reduced.

Figure 31:
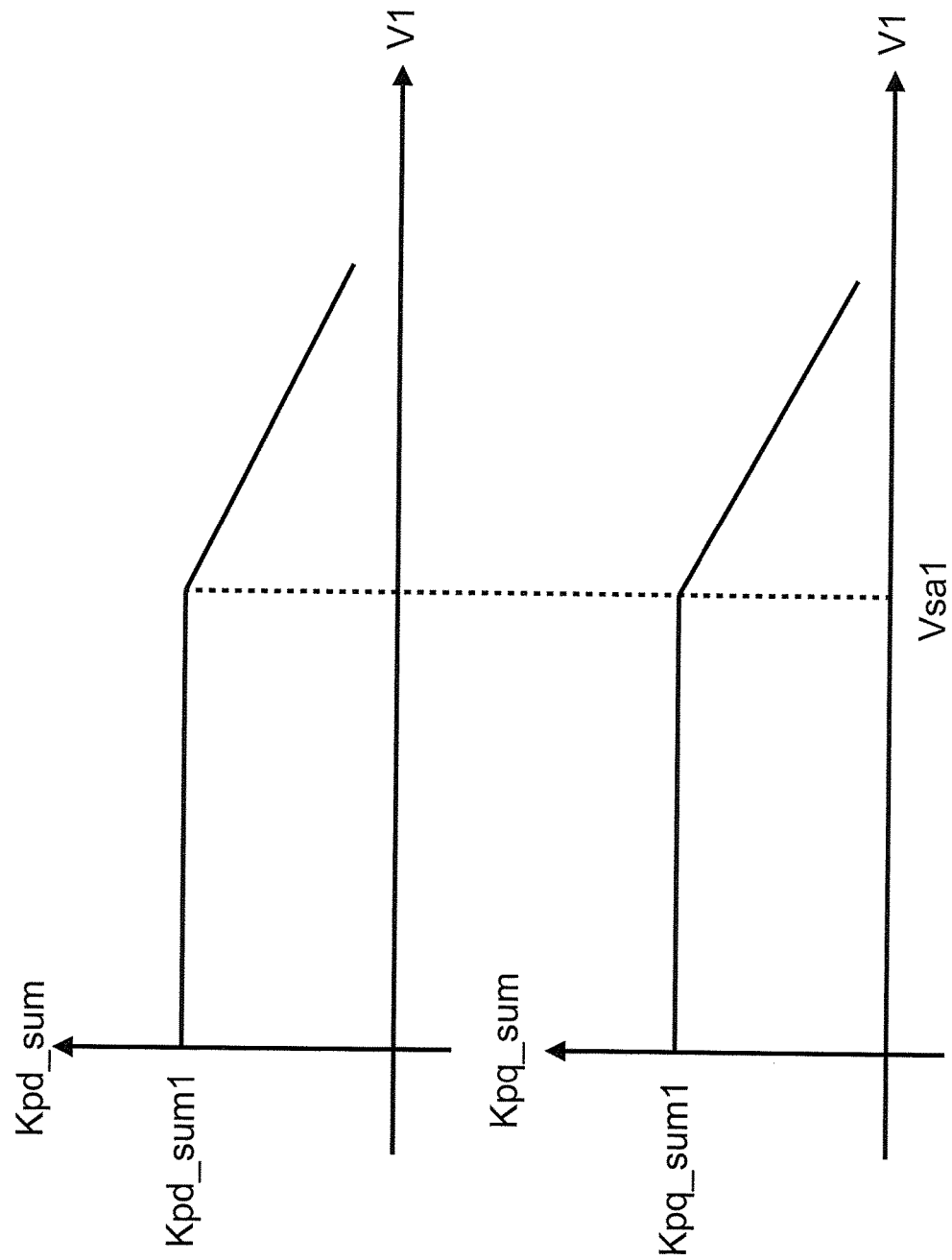
FIG. 31 is a view showing a condition in which a sum current gain is varied on the basis of the first voltage command, according to the fourth embodiment of this invention.

FIG. 31 is a view showing a condition in which the sum current gains are varied on the basis of the first voltage commands, according to the fourth embodiment of this invention. FIG. 31 shows an example of a case in which the sum current gains Kpd_sum, Kpq_sum are varied in accordance with the amplitude V1 of the first voltage commands. When the amplitude V1 of the first voltage commands is no higher than the threshold Vsa1, the sum current gains Kpd_sum, Kpq_sum are set respectively at fixed values Kpd_sum1, Kpq_sum1.

When the amplitude V1 of the first voltage commands exceeds the threshold Vsa1, on the other hand, the sum current gains Kpd_sum, Kpq_sum are reduced along a straight line. The threshold Vsa1 and the incline of the straight line may be determined in accordance with the generated pulsation level.

Further, the amplitude V2 of the second voltage commands, which is given above in Equation (36), the amplitude V_sum of the sum voltages, which is given above in Equation (37), or a combination of V1, V2, and V_sum may be used as the abscissa of FIG. 31. Moreover, the sum current gains Kpd_sum, Kpq_sum may be switched in accordance with effective values rather than the amplitude of the first voltage commands, the second voltage commands, or the sum voltages.

Furthermore, similar effects are obtained with a configuration in which the rotation speed of the AC rotary machine 1a is set as the abscissae of FIGS. 30 and 31 such that the sum current gains and differential current gains are set at fixed values at or below a predetermined speed-related threshold, and reduced in accordance with the speed above the predetermined threshold.

Moreover, the control device for an AC rotary machine described in the first to fourth embodiments may be applied to control of an electric power steering having a control device for an AC rotary machine. An electric power steering device requires a control unit that calculates first voltage commands and second voltage commands such that the AC rotary machine generates torque for assisting the steering torque of a steering system.

By applying the control device for an AC rotary machine according to this invention as a control unit for an electric power steering device of this type, the first voltage commands and the second voltage commands can be calculated at a high amplitude while maintaining the switching period Tsw. As a result, a steering system in which the switching frequency, which is given by the inverse of the switching period, is outside the audible range such that increased output is obtained at an identical volume ratio while keeping the amount of noise low can be constructed. In other words, the device can be reduced in size while obtaining an identical output ratio, and therefore a steering system that is easy to install can be realized.

The invention claimed is:

1. A control device for an AC rotary machine, comprising:
   an AC rotary machine that includes a first three-phase winding and a second three-phase winding having a phase difference;
   a DC power supply for outputting a DC voltage;
   a control unit that calculates a first voltage command and a second voltage command on the basis of a current command and a detected current value of the AC rotary machine;
   a first voltage application device that applies a voltage to each phase of the first three-phase winding at an ON interval or an OFF interval equaling or exceeding a first predetermined value by ON/OFF-controlling the DC voltage supplied by the DC power supply on the basis of the first voltage command;
   a second voltage application device that applies a voltage to each phase of the second three-phase winding at an ON interval or an OFF interval equaling or exceeding the first predetermined value by ON/OFF-controlling a DC voltage supplied by the DC power supply on the basis of the second voltage command;
   a first current detector that detects a first three-phase current on the basis of a first bus current flowing between the DC power supply and the first voltage application device;
   a second current detector that detects a second three-phase current on the basis of a second bus current flowing between the DC power supply and the second voltage application device;
   a first detectability determination device that determines whether or not the first three-phase current is detectable on the basis of at least one of the first voltage command and the second voltage command; and
   a second detectability determination device that determines whether or not the second three-phase current is detectable on the basis of at least one of the first voltage command and the second voltage command,
   wherein, when the first detectability determination device determines that the first three-phase current is undetectable, the control unit generates the first voltage command such that ON timings or OFF timings relating respectively to at least two phases of the voltage applied to the first three-phase winding are within a second predetermined value that is smaller than the first predetermined value, and
   when the second detectability determination device determines that the second three-phase current is undetectable, the control unit generates the second voltage command such that ON timings or OFF timings relating respectively to at least two phases of the voltage applied to the second three-phase winding are within the second predetermined value.

2. The control device for an AC rotary machine according to claim 1, wherein, when voltages of three phases constituting the first voltage command are set in descending order as a first maximum phase voltage, a first intermediate phase voltage, and a first minimum phase voltage, the first detectability determination device determines whether or not the first three-phase current is detectable on the basis of the first intermediate phase voltage.

3. The control device for an AC rotary machine according to claim 2, wherein the first detectability determination device determines that a first condition in which the first three-phase current is undetectable is established when the first intermediate phase voltage exceeds a third predetermined value, and
   when the first detectability determination device determines that the first condition is established, the control unit generates the first voltage command such that respective ON timings or OFF timings of a phase corresponding to the first maximum phase voltage and a phase corresponding to the first intermediate phase voltage are within the second predetermined value.

4. The control device for an AC rotary machine according to claim 2, wherein the first detectability determination device determines that a second condition in which the first three-phase current is undetectable is established when the first intermediate phase voltage is smaller than a fourth predetermined value, and
   when the first detectability determination device determines that the second condition is established, the control unit generates the first voltage command such that respective ON timings or OFF timings of a phase corresponding to the first intermediate phase voltage and a phase corresponding to the first minimum phase voltage are within the second predetermined value.

5. The control device for an AC rotary machine according to claim 2, wherein the first detectability determination device determines that a third condition in which the first three-phase current is undetectable is established when a difference between the first maximum phase voltage and the first intermediate phase voltage is smaller than a fifth predetermined value, and
   when the first detectability determination device determines that the third condition is established, the control unit generates the first voltage command such that respective ON timings or OFF timings of a phase corresponding to the first maximum phase voltage and a phase corresponding to the first intermediate phase voltage are within the second predetermined value.

6. The control device for an AC rotary machine according to claim 2, wherein the first detectability determination device determines that a fourth condition in which the first three-phase current is undetectable is established when a difference between the first intermediate phase voltage and the first minimum phase voltage is smaller than a fifth predetermined value, and when the first detectability determination device determines that the fourth condition is established, the control unit generates the first voltage command such that respective ON timings or OFF timings of a phase corresponding to the first intermediate phase voltage and a phase corresponding to the first minimum phase voltage are within the second predetermined value.

7. The control device for an AC rotary machine according to claim 1, wherein the first detectability determination device determines whether or not the first three-phase current is detectable in accordance with a voltage phase angle of the first voltage command or a voltage phase angle of the second voltage command.

8. The control device for an AC rotary machine according to claim 1, wherein, when voltages of three phases constituting the second voltage command are set in descending order as a second maximum phase voltage, a second intermediate phase voltage, and a second minimum phase voltage, the second detectability determination device determines whether or not the second three-phase current is detectable on the basis of the second intermediate phase voltage.

9. The control device for an AC rotary machine according to claim 8, wherein the second detectability determination device determines that a fifth condition in which the second three-phase current is undetectable is established when the second intermediate phase voltage exceeds a third predetermined value, and
when the second detectability determination device determines that the fifth condition is established, the control unit generates the second voltage command such that respective ON timings or OFF timings of a phase corresponding to the second maximum phase voltage and a phase corresponding to the second intermediate phase voltage are within the second predetermined value.

10. The control device for an AC rotary machine according to claim 8, wherein the second detectability determination device determines that a sixth condition in which the second three-phase current is undetectable is established when the second intermediate phase voltage is smaller than a fourth predetermined value, and
when the second detectability determination device determines that the sixth condition is established, the control unit generates the second voltage command such that respective ON timings or OFF timings of a phase corresponding to the second intermediate phase voltage and a phase corresponding to the second minimum phase voltage are within the second predetermined value.

11. The control device for an AC rotary machine according to claim 8, wherein the second detectability determination device determines that a seventh condition in which the second three-phase current is undetectable is established when a difference between the second maximum phase voltage and the second intermediate phase voltage is smaller than a fifth predetermined value, and
when the second detectability determination device determines that the seventh condition is established, the control unit generates the second voltage command such that respective ON timings or OFF timings of a phase corresponding to the second maximum phase voltage and a phase corresponding to the second intermediate phase voltage are within the second predetermined value.

12. The control device for an AC rotary machine according to claim 8, wherein the second detectability determination device determines that an eighth condition in which the second three-phase current is undetectable is established when a difference between the second intermediate phase voltage and the second minimum phase voltage is smaller than a fifth predetermined value, and
when the second detectability determination device determines that the eighth condition is established, the control unit generates the second voltage command such that respective ON timings or OFF timings of a phase corresponding to the second intermediate phase voltage and a phase corresponding to the second minimum phase voltage are within the second predetermined value.

13. The control device for an AC rotary machine according to claim 8, wherein the second detectability determination device determines whether or not the second three-phase current is detectable in accordance with a voltage phase angle of the first voltage command or a voltage phase angle of the second voltage command.

14. The control device for an AC rotary machine according to claim 1, wherein, when the first detectability determination device determines that the first three-phase current is detectable and the second detectability determination device determines that the second three-phase current is detectable, the control unit calculates the first voltage command on the basis of the first three-phase current and calculates the second voltage command on the basis of the second three-phase current,
when the first detectability determination device determines that the first three-phase current is undetectable and the second detectability determination device determines that the second three-phase current is detectable, the control unit calculates the first voltage command and the second voltage command on the basis of the second three-phase current, and
when the first detectability determination device determines that the first three-phase current is detectable and the second detectability determination device determines that the second three-phase current is undetectable, the control unit calculates the first voltage command and the second voltage command on the basis of the first three-phase current.

15. The control device for an AC rotary machine according to claim 1, wherein, in a first case where the first detectability determination device determines that the first three-phase current is detectable and the second detectability determination device determines that the second three-phase current is detectable, the control unit calculates a sum voltage on the basis of a sum current, which is a sum of the first three-phase current and the second three-phase current, the current command, and a sum current gain, and calculates a differential voltage on the basis of a differential current, which is a difference between the first three-phase current and the second three-phase current, and a differential current gain,
in a second case where the first detectability determination device determines that the first three-phase current is undetectable, the control unit calculates the sum voltage on the basis of the second three-phase current, the current command, and the sum current gain, and sets the differential current or the differential voltage at zero,
in a third case where the second detectability determination device determines that the second three-phase current is undetectable, the control unit calculates the sum voltage on the basis of the first three-phase current, the current command, and the sum current gain, and sets the differential current or the differential voltage at zero, and in each of the first case, the second case, and the third case, the control unit calculates the first voltage command and the second voltage command on the basis of the sum voltage and the differential voltage.

16. The control device for an AC rotary machine according to claim 15, wherein the control unit modifies the differential current gain in accordance with at least one of the first voltage command, the second voltage command, the sum voltage, and a rotation speed of the AC rotary machine.

17. The control device for an AC rotary machine according to claim 15, wherein the control unit modifies the sum current gain in accordance with at least one of the first voltage command, the second voltage command, the sum voltage, and a rotation speed of the AC rotary machine.

18. The control device for an AC rotary machine according to claim 1, wherein the phase difference is 30±60×n (where n is an integer).

19. A control device for an electric power steering, comprising the control device for an AC rotary machine according to claim 1, wherein the control unit calculates the first voltage command and the second voltage command such that the AC rotary machine generates torque for assisting steering torque of a steering system.

* * * * *